(12) United States Patent
Sheppard et al.

(10) Patent No.: US 12,106,325 B2
(45) Date of Patent: *Oct. 1, 2024

(54) METHODS AND APPARATUS FOR AUDIENCE AND IMPRESSION DEDUPLICATION

(71) Applicant: The Nielsen Company (US), LLC, New York, NY (US)

(72) Inventors: Michael R. Sheppard, Holland, MI (US); Dongbo Cui, New York, NY (US); Diane Morovati Lopez, West Hills, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,159

(22) Filed: Oct. 31, 2023

(65) Prior Publication Data
US 2024/0152957 A1      May 9, 2024

Related U.S. Application Data

(63) Continuation of application No. 17/961,381, filed on Oct. 6, 2022, now Pat. No. 11,816,698, which is a continuation of application No. 17/008,263, filed on Aug. 31, 2020, now Pat. No. 11,481,802.

(51) Int. Cl.
*G06Q 30/0242*     (2023.01)

(52) U.S. Cl.
CPC .................. *G06Q 30/0246* (2013.01)

(58) Field of Classification Search
CPC .................................................. G06Q 30/0246
See application file for complete search history.

(56) References Cited

U.S. PATENT DOCUMENTS

| 6,029,045 A | 2/2000 | Picco et al. |
| 8,171,032 B2 | 5/2012 | Herz |
| 8,214,518 B1 | 7/2012 | Bertz |

(Continued)

FOREIGN PATENT DOCUMENTS

WO      2008127737 A1      10/2008

OTHER PUBLICATIONS

Araujo _2017.*

(Continued)

*Primary Examiner* — Michael I Ezewoko

(57) ABSTRACT

Methods, apparatus, systems and articles of manufacture to estimate and deduplicate audiences are disclosed herein. An example apparatus includes a controller to determine a subunion of at least first and second marginal audiences of media based on of panel data and census data, the panel data including a panel impression count and a panel audience size, and the census data including a census impression count, an audience size calculator to determine a census audience size of the at least the first and second marginal audiences based on the panel impression count and the panel audience size and determine a subunion census audience size, the subunion census audience size corresponding to an overlap between the at least the first and second marginal audiences; and a report generator to generate a report including the census audience size and the subunion census audience size.

17 Claims, 11 Drawing Sheets

(56) References Cited

U.S. PATENT DOCUMENTS

| | | | |
|---|---|---|---|
| 8,619,892 B2* | 12/2013 | Vetter | H04B 7/0452 375/267 |
| 8,874,652 B1 | 10/2014 | Pecjak et al. | |
| 8,930,701 B2 | 1/2015 | Burbank et al. | |
| 8,973,023 B1* | 3/2015 | Rao | G06Q 30/0242 705/14.44 |
| 9,070,139 B2* | 6/2015 | Zhang | G06Q 30/02 |
| 9,094,710 B2 | 7/2015 | Lee et al. | |
| 9,111,186 B2* | 8/2015 | Blasinski | G06K 19/0614 |
| 9,224,094 B2* | 12/2015 | Oliver | G06Q 30/0204 |
| 9,236,962 B2* | 1/2016 | Hawkins | H04N 7/16 |
| 9,237,138 B2 | 1/2016 | Bosworth et al. | |
| 9,420,320 B2* | 8/2016 | Doe | H04H 60/66 |
| 9,529,836 B1* | 12/2016 | Hale | G06F 8/65 |
| 10,045,057 B2* | 8/2018 | Shah | H04N 21/42684 |
| 10,045,082 B2 | 8/2018 | Nagaraja Rao et al. | |
| 10,070,166 B2* | 9/2018 | Chaar | H04H 60/06 |
| 10,313,752 B2* | 6/2019 | Nagaraja Rao | G06F 16/215 |
| 10,491,696 B2* | 11/2019 | Gierada | H04N 21/25891 |
| 10,602,224 B2* | 3/2020 | Sullivan | H04N 21/812 |
| 10,609,451 B2 | 3/2020 | De Andrade et al. | |
| 10,728,614 B2* | 7/2020 | Sheppard | H04N 21/25883 |
| 10,743,064 B2 | 8/2020 | Berezowski et al. | |
| 10,856,027 B2* | 12/2020 | Sheppard | H04N 21/251 |
| 11,012,746 B2 | 5/2021 | Nagaraja Rao et al. | |
| 11,216,834 B2* | 1/2022 | Sheppard | G06F 7/53 |
| 11,323,772 B2 | 5/2022 | Sheppard et al. | |
| 11,425,458 B2 | 8/2022 | Sheppard et al. | |
| 11,438,662 B2 | 9/2022 | Sullivan et al. | |
| 11,481,802 B2* | 10/2022 | Sheppard | G06Q 30/0246 |
| 11,483,606 B2 | 10/2022 | Sheppard et al. | |
| 11,523,177 B2 | 12/2022 | Sheppard et al. | |
| 11,553,226 B2 | 1/2023 | Sheppard et al. | |
| 2004/0059549 A1 | 3/2004 | Kropaczek et al. | |
| 2011/0015992 A1 | 1/2011 | Liffiton et al. | |
| 2013/0290233 A1* | 10/2013 | Ferren | H04N 21/4516 706/46 |
| 2013/0339991 A1* | 12/2013 | Ricci | H04N 21/4758 725/25 |
| 2013/0346033 A1* | 12/2013 | Wang | G06Q 30/0206 703/2 |
| 2014/0101685 A1* | 4/2014 | Kitts | H04N 21/251 725/14 |
| 2014/0112557 A1* | 4/2014 | Santamaria-Pang | G06T 7/12 382/128 |
| 2014/0280891 A1* | 9/2014 | Doe | G06Q 30/02 709/224 |
| 2014/0337104 A1* | 11/2014 | Splaine | G06Q 30/0204 705/7.33 |
| 2014/0358676 A1* | 12/2014 | Srivastava | H04L 67/535 705/14.45 |
| 2015/0032310 A1* | 1/2015 | Zettel | B60W 20/16 180/65.265 |
| 2015/0180989 A1* | 6/2015 | Seth | G06Q 30/0276 709/224 |
| 2015/0186403 A1* | 7/2015 | Srivastava | H04N 21/44226 707/692 |
| 2015/0193813 A1 | 7/2015 | Toupet et al. | |
| 2015/0332310 A1* | 11/2015 | Cui | G06Q 30/0275 705/14.45 |
| 2016/0012314 A1* | 1/2016 | Ramamurthy | G06V 10/7715 382/160 |
| 2016/0086208 A1* | 3/2016 | Oliver | H04L 43/0876 705/7.33 |
| 2016/0134934 A1 | 5/2016 | Jared et al. | |
| 2016/0162955 A1* | 6/2016 | O'Kelley | G06Q 30/0277 705/14.71 |
| 2016/0165277 A1* | 6/2016 | Kirillov | H04N 21/25891 725/14 |
| 2016/0232538 A1 | 8/2016 | Papakostas et al. | |
| 2016/0232563 A1* | 8/2016 | Perez | G06F 16/951 |
| 2016/0249098 A1* | 8/2016 | Pecjak | H04N 21/44224 |
| 2016/0269783 A1* | 9/2016 | Mowrer | H04N 21/42203 |
| 2016/0323616 A1* | 11/2016 | Doe | H04N 21/25866 |
| 2016/0379246 A1* | 12/2016 | Sheppard | G06Q 30/0246 705/14.45 |
| 2017/0006342 A1* | 1/2017 | Nagaraja Rao | H04N 21/812 |
| 2017/0034594 A1 | 2/2017 | Francis et al. | |
| 2017/0155956 A1* | 6/2017 | Nagaraja Rao | H04N 21/44226 |
| 2017/0187478 A1* | 6/2017 | Shah | H04N 21/26603 |
| 2017/0213243 A1* | 7/2017 | Dollard | G06Q 30/0249 |
| 2017/0300911 A1 | 10/2017 | Alnajem | |
| 2018/0073933 A1* | 3/2018 | Keskin | G01K 1/14 |
| 2018/0189950 A1 | 7/2018 | Norouzi et al. | |
| 2018/0225709 A1* | 8/2018 | Ferber | G06N 20/00 |
| 2018/0249208 A1* | 8/2018 | Sheppard | H04N 21/4667 |
| 2018/0249210 A1* | 8/2018 | Sheppard | H04N 21/44222 |
| 2018/0249211 A1* | 8/2018 | Sheppard | G06Q 30/0201 |
| 2018/0249214 A1* | 8/2018 | Sullivan | H04N 21/6156 |
| 2018/0315060 A1 | 11/2018 | Sheppard et al. | |
| 2018/0376198 A1* | 12/2018 | Sheppard | H04N 21/458 |
| 2019/0147461 A1* | 5/2019 | Sheppard | G06Q 30/0201 705/14.41 |
| 2019/0354574 A1* | 11/2019 | Wick | G06N 5/04 |
| 2019/0356950 A1* | 11/2019 | Sheppard | H04N 21/25883 |
| 2020/0120387 A1* | 4/2020 | Sheppard | G06Q 30/0201 |
| 2020/0204863 A1* | 6/2020 | Sullivan | H04N 21/44222 |
| 2020/0294069 A1* | 9/2020 | Sheppard | G06Q 30/0204 |
| 2020/0296441 A1* | 9/2020 | Sheppard | H04N 21/25883 |
| 2020/0359090 A1* | 11/2020 | Sheppard | H04N 21/44213 |
| 2021/0014564 A1* | 1/2021 | Sheppard | G06Q 30/0201 |
| 2021/0058659 A1* | 2/2021 | Sheppard | H04N 21/44204 |
| 2021/0065230 A1 | 3/2021 | Flynn | |
| 2021/0133773 A1* | 5/2021 | Sheppard | G06Q 30/0273 |
| 2021/0158377 A1 | 5/2021 | Sheppard et al. | |
| 2021/0303552 A1* | 9/2021 | Pandey | G06Q 10/10 |
| 2021/0319002 A1* | 10/2021 | Ryan | G06F 16/2246 |
| 2022/0038781 A1 | 2/2022 | Sullivan et al. | |
| 2022/0058667 A1 | 2/2022 | Sheppard et al. | |
| 2022/0122104 A1 | 4/2022 | Sheppard et al. | |
| 2022/0159326 A1 | 5/2022 | Sheppard et al. | |
| 2022/0264179 A1 | 8/2022 | Sheppard et al. | |
| 2022/0264187 A1 | 8/2022 | Sheppard et al. | |
| 2022/0408154 A1 | 12/2022 | Sheppard et al. | |
| 2023/0042879 A1 | 2/2023 | Sheppard et al. | |
| 2023/0070980 A1 | 3/2023 | Sullivan et al. | |
| 2023/0111617 A1 | 4/2023 | Sheppard et al. | |

OTHER PUBLICATIONS

Buzzard_1985.*

Esch et al., Appendix 8 Numerical Methods for Solving Nonlinear Equations, Asset and Risk Management: Risk Oriented Finance, published 2005 by John Wiley & Sons Ltd., 7 pages.

International Searching Authority, International Search Report & Written issued Opinion, in connection with application No. PCT/US2021/026010, on Jul. 26, 2021, 8 pages.

International Searching Authority, International Search Report & Written Opinion, in connection with application No. PCT/US2020/022436 on Jul. 6, 2020, 7 pages.

International Searching Authority, International Search Report and Written Opinion, issued in connection with PCT Application No. PCT/US2022/015516, dated May 26, 2022, 7 pages.

International Searching Authority. International Search Report & Written Opinion, issued in connection with application No. PCT/US2020/022438 on Jul. 6, 2020, 8 pages.

United States Patent and Trademark Office, Non-Final Rejection, issued in connection with U.S. Appl. No. 17/408,208, Aug. 15, 2022, 24 pages.

United States Patent and Trademark Office, Advisory Action, issued in connection with U.S. Appl. No. 16/657,652, on Aug. 19, 2021, 4 pages.

United States Patent and Trademark Office, Advisory Action, issued in connection with U.S. Appl. No. 16/676,158, mailed on Oct. 6, 2022, 3 pages.

United States Patent and Trademark Office, Advisory Action, issued in connection with U.S. Appl. No. 17/408,208, on Mar. 3, 2023, 2 pages.

(56) References Cited

OTHER PUBLICATIONS

United States Patent and Trademark Office, Final Office Action issued in connection with U.S. Appl. No. 15/445,543, on Aug. 3, 2018, 16 pages.

United States Patent and Trademark Office, Final Office Action issued in connection with U.S. Appl. No. 15/445,543, on Jul. 18, 2019, 12 pages.

United States Patent and Trademark Office, Final Office Action issued in connection with U.S. Appl. No. 15/619,257, on Jan. 18, 2019, 18 pages.

United States Patent and Trademark Office, Final Office Action issued in connection with U.S. Appl. No. 15/445,557, on Dec. 27, 2018, 9 pages.

United States Patent and Trademark Office, Final Office Action, issued in connection with U.S. Appl. No. 16/355,386, on May 4, 2021, 10 pages.

United States Patent and Trademark Office, Final Office Action, issued in connection with U.S. Appl. No. 16/526,747, on Dec. 30, 2020, 8 pages.

United States Patent and Trademark Office, Final Office Action, issued in connection with U.S. Appl. No. 16/657,652, on May 14, 2021, 19 pages.

United States Patent and Trademark Office, Final Office Action, issued in connection with U.S. Appl. No. 16/676,158, on Jul. 29, 2022, 30 pages.

United States Patent and Trademark Office, Final Office Action, issued in connection with U.S. Appl. No. 16/843,650, on Dec. 17, 2021, 33 pages.

United States Patent and Trademark Office, Final Office Action, issued in connection with U.S. Appl. No. 16/939,996, on Dec. 16, 2021, 19 pages.

United States Patent and Trademark Office, Final Office Action, issued in connection with U.S. Appl. No. 17/408,208, on Apr. 20, 2022, 26 pages.

United States Patent and Trademark Office, Final Office Action, issued in connection with U.S. Appl. No. 17/408,208, on Dec. 8, 2022, 10 pages.

United States Patent and Trademark Office, Final Office Action, issued in connection with U.S. Appl. No. 16/843,650, mailed on Apr. 10, 2023, 40 pages.

United States Patent and Trademark Office, Non-Final Office Action issued in connection with U.S. Appl. No. 15/445,530, on Apr. 11, 2018, 9 pages.

United States Patent and Trademark Office, Non-Final Office action issued in connection with U.S. Appl. No. 15/635,153, on Feb. 5, 2018, 8 pages.

United States Patent and Trademark Office, Non-Final Office Action issued in connection with U.S. Appl. No. 16/676,158, mailed on Mar. 18, 2022, 29 pages.

United States Patent and Trademark Office, Non-Final Office action, issued in connection with U.S. Appl. No. 15/445,543, on Jan. 11, 2018, 19 pages.

United States Patent and Trademark Office, Non-Final Office Action, issued in connection with U.S. Appl. No. 15/445,543, on Jan. 8, 2019, 15 pages.

United States Patent and Trademark Office, Non-Final Office Action, issued in connection with U.S. Appl. No. 15/445,557, on Jun. 29, 2018, 11 pages.

United States Patent and Trademark Office, Non-Final Office Action, issued in connection with U.S. Appl. No. 15/619,257, on Jun. 15, 2018, 15 pages.

United States Patent and Trademark Office, Non-Final Office Action, issued in connection with U.S. Appl. No. 16/355,386, on Nov. 9, 2020, 8 pages.

United States Patent and Trademark Office, Non-Final Office Action, issued in connection with U.S. Appl. No. 16/526,747, on Jul. 23, 2020, 7 pages.

United States Patent and Trademark Office, Non-Final Office Action, issued in connection with U.S. Appl. No. 16/657,652, on Oct. 18, 2021, 22 pages.

United States Patent and Trademark Office, Non-Final Office Action, issued in connection with U.S. Appl. No. 16/657,652, on Oct. 27, 2020, 18 pages.

United States Patent and Trademark Office, "Non-Final Office Action," issued in connection with U.S. Appl. No. 17/892,659, on Oct. 18, 2023, 26 pages.

United States Patent and Trademark Office, Non-Final Office Action, issued in connection with U.S. Appl. No. 16/676,158, on Nov. 29, 2021, 24 pages.

United States Patent and Trademark Office, Non-Final Office Action, issued in connection with U.S. Appl. No. 16/843,650, on Dec. 2, 2022, 43 pages.

United States Patent and Trademark Office, Non-Final Office Action, issued in connection with U.S. Appl. No. 16/843,650, on Jul. 29, 2022, 36 pages.

United States Patent and Trademark Office, Non-Final Office Action, issued in connection with U.S. Appl. No. 16/843,650, on May 26, 2021, 26 pages.

United States Patent and Trademark Office, Non-Final Office Action, issued in connection with U.S. Appl. No. 16/893,129, on Apr. 13, 2021, 8 pages.

United States Patent and Trademark Office, Non-Final Office Action, issued in connection with U.S. Appl. No. 16/939,996, on Jun. 24, 2021, 15 pages.

United States Patent and Trademark Office, Non-Final Office Action, issued in connection with U.S. Appl. No. 17/093,460, on Oct. 22, 2021, 5 pages.

United States Patent and Trademark Office, Non-Final Office Action, issued in connection with U.S. Appl. No. 17/099,510, on Mar. 29, 2022, 6 pages.

United States Patent and Trademark Office, Non-Final Office Action, issued in connection with U.S. Appl. No. 17/408,208, on Jan. 5, 2022, 21 pages.

United States Patent and Trademark Office, Non-Final Office Action, issued in connection with U.S. Appl. No. 17/465,567, dated Nov. 16, 2022, 12 pages.

United States Patent and Trademark Office, Non-Final Office Action, issued in connection with U.S. Appl. No. 17/567,710, on Oct. 14, 2022, 8 pages.

United States Patent and Trademark Office, Non-Final Office Action, issued in connection with U.S. Appl. No. 17/666,359, on Aug. 18, 2022, 8 pages.

United States Patent and Trademark Office, Non-Final Office Action, issued in connection with U.S. Appl. No. 17/734,792, on Oct. 13, 2022, 6 pages.

United States Patent and Trademark Office, Non-Final Office Action, issued in connection with U.S. Appl. No. 17/902,612, on Jan. 6, 2023, 5 pages.

United States Patent and Trademark Office, Non-Final Office Action, issued in connection with U.S. Appl. No. 17/408,164, dated Mar. 29, 2023, 14 pages.

United States Patent and Trademark Office, Non-Final Office Action, issued in connection with U.S. Appl. No. 17/408,208, dated May 10, 2023, 9 Pages.

United States Patent and Trademark Office, "Non-Final Office Action," issued in connection with U.S. Appl. No. 18/320,958, on Apr. 23, 2024, 7 pages.

United States Patent and Trademark Office, "Non-Final Office Action," issued Mar. 21, 2024 in connection with U.S. Appl. No. 17/961,514, 22 pages.

United States Patent and Trademark Office, "Restriction Requirement," issued in connection with U.S. Appl. No. 17/892,659, on Mar. 22, 2024, 6 pages.

United States Patent and Trademark Office, "Non-Final Office Action," issued in connection with U.S. Appl. No. 17/666,359, on Nov. 18, 2022, 9 pages.

* cited by examiner

300

|  | PANEL | | CENSUS | |
|---|---|---|---|---|
| | 302 | 304 | 306 | |
| WEBSITE (j) | IMPRESSIONS | AUDIENCE | IMPRESSIONS | AUDIENCE |
| 1 | 4,000 | 3,000 | 5,000 | $X_1$ |
| 2 | 23,000 | 14,000 | 30,000 | $X_2$ |
| 3 | 14,000 | 10,000 | 20,000 | $X_3$ |
| 4 | 5,000 | 4,000 | 10,000 | $X_4$ |
| TOTAL | 46,000 | 25,000 | 65,000 | 30,000 |
| | 316 | 318 | 320 | 322 |

|  | PANEL | | CENSUS | |
|---|---|---|---|---|
| | 302 | 304 | 306 | 352 |
| WEBSITE (j) | IMPRESSIONS | AUDIENCE | IMPRESSIONS | AUDIENCE |
| 1 | 4,000 | 3,000 | 5,000 | 3,572 |
| 2 | 23,000 | 14,000 | 30,000 | 16,546 |
| 3 | 14,000 | 10,000 | 20,000 | 12,882 |
| 4 | 5,000 | 4,000 | 10,000 | 6,869 |
| TOTAL | 46,000 | 25,000 | 65,000 | 30,000 |
| | 316 | 318 | 320 | 322 |

|   | PANEL IMPRESSION | PANEL AUDIENCE | CENSUS IMPRESSIONS | CENSUS AUDIENCE |
|---|---|---|---|---|
| A | $R_1 = 200$ | $A_1 = 100$ | $T_1 = 400$ | $X_1 = (?)$ |
| B | $R_2 = 300$ | $A_2 = 200$ | $T_2 = 600$ | $X_2 = (?)$ |
| C | $R_3 = 500$ | $A_3 = 300$ | $T_3 = 800$ | $X_3 = (?)$ |
| ABC |  | $A_d = 400$ |  | $X_d = (?)$ |

|   | PANEL IMPRESSION | PANEL AUDIENCE | CENSUS IMPRESSIONS | CENSUS AUDIENCE |
|---|---|---|---|---|
| A | $R_1 = 200$ | $A_1 = 100$ | $T_1 = 400$ | $X_1 = 193$ |
| B | $R_2 = 300$ | $A_2 = 200$ | $T_2 = 600$ | $X_2 = 386$ |
| C | $R_3 = 500$ | $A_3 = 300$ | $T_3 = 800$ | $X_3 = 510$ |
| ABC |  | $A_d = 400$ |  | $X_d = 720$ |

FIG. 4B

| | AGGREGATION | DEMOGRAPHIC | WEBSITE | PLATFORM | AUDIENCE | IMPRESSIONS |
|---|---|---|---|---|---|---|
| 512 | MARGINAL | F:02-12 | example.com | DESKTOP | 100 | 120 |
| 514 | MARGINAL | F:02-12 | example.com | MOBILE | 176 | 200 |
| 516 | MARGINAL | F:13-18 | example.com | MOBILE | 250 | 252 |
| 518 | ... | ... | ... | ... | ... | ... |
| | UNION | F:02-12 | ALL | ALL | 1020 | 1125 |
| 520 | UNION | F:13-18 | ALL | ALL | 1200 | 1235 |
| | ... | ... | ... | ... | ... | ... |

FIG. 5

|  | PANDAS | PYSPARK |
|---|---|---|
| ENVIRONMENT | - WINDOWS 10 64bit<br>- INTEL 17-8665U<br>- 8GB MEMORY | - LINUX AMD64 CLUSTER<br>- SPARK: CPU CORES 4<br>- MAX EXECUTOR 4<br>- DRIVER MEM. 2GB<br>- EXECUTOR MEM. 2GB<br>- PARTITIONS 200 |
| # PARALLEL GROUPS | 3,800 | 396,675 |
| #ROWS TO IMPUTE | 262,115 | 48,535,902 |
| #ROWS TO OUTPUT | 726,954 | 169,699,398 |
| ALIGN DATA (sec) | SUBSET OF SPARK | 295.90 |
| IMPUTE UNION (sec) | 0.028 | 213.20 |
| IMPUTE MARGINAL (sec) | 12.76 | 418.49 |
| IMPUTE SUBUNIONS (sec) | 2.28 | 334.73 |
| TOTAL TIME | 15.068 sec | 21.04 min |
| AVERAGE TIME (ms) | 3.97 | 3.18 |

FIG. 6

METHODS AND APPARATUS FOR AUDIENCE AND IMPRESSION DEDUPLICATION

CROSS-REFERENCE TO RELATED APPLICATIONS

This disclosure is a continuation of U.S. patent application Ser. No. 17/961,381, filed on Oct. 6, 2022, issued as, which is a continuation of U.S. patent application Ser. No. 17/008,263, filed on Aug. 31, 2020, issued as U.S. Pat. No. 11,481,802, each of which is incorporated herein by reference in its entirety.

FIELD OF THE DISCLOSURE

This disclosure relates generally to computer-based audience measurement, and, more particularly, to methods and apparatus for audience and impression deduplication.

BACKGROUND

Tracking user access to media has been used by broadcasters and advertisers to determine viewership information for the media. Tracking viewership of media can present useful information to broadcasters and advertisers when determining placement strategies for digital advertising. The success of advertisement placement strategies is dependent on the accuracy that technology can achieve in generating audience metrics.

BRIEF DESCRIPTION OF THE DRAWINGS

FIG. 3A is a table showing example panel impression counts, panel audience sizes, and census impression counts.

FIG. 3B is a table showing example panel impression counts, panel audience sizes, census impression counts, and census audience sizes.

FIG. 4A is a table showing example panel impression counts, panel audience sizes, and census impression counts.

FIG. 4B is a table showing example panel impression counts, panel audience sizes, census impression counts, and census audience sizes.

FIG. 5 is a table showing example aggregate audience sizes and impression counts.

FIG. 6 shows results of a comparative analysis of FIG. 1 in two environments.

The figures are not to scale. In general, the same reference numbers will be used throughout the drawing(s) and accompanying written description to refer to the same or like parts.

Figure 1:
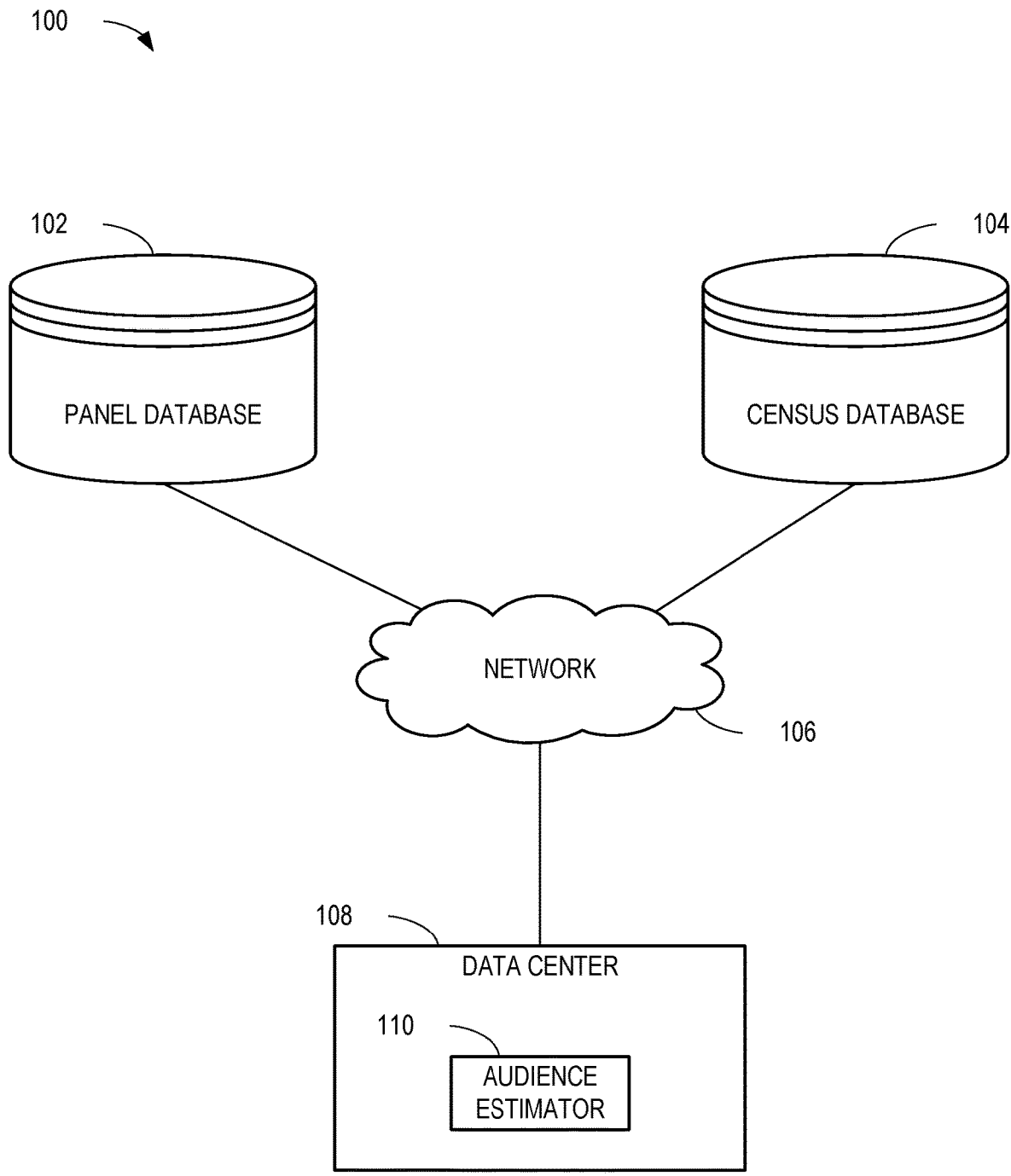
FIG. 1 illustrates an example audience estimation system constructed in accordance with teachings of this disclosure for audience and impression deduplication.

Unless specifically stated otherwise, descriptors such as "first," "second" "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Techniques for monitoring user access to an Internet-accessible media, such as digital television (DTV) media, digital advertisement ratings (DAR), and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population or audience members (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. As used herein, an audience size is a quantity of unique audience members of particular events (e.g., exposed to particular media, etc.). That is, an audience size is a number of deduplicated or unique audience members exposed to a media item of interest of audience metrics analysis. A deduplicated or unique audience member is one that is counted only once as part of an audience size. That is, a deduplicated audience member corresponds to a non-duplicate count of an audience size. Thus, regardless of whether a particular person is detected as accessing a media item once or multiple times, that person is only counted once as the audience size for that media item. In this manner, impression performance for particular media is not disproportionately represented when a small subset of one or more audience members is exposed to the same media an excessively large number of times while a larger number of audience members is exposed fewer times or not at all to that same media. Audience size may also be referred to as unique audience or deduplicated audience. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

As used herein, a marginal audience, $M_i$, is a subset of an audience for an event i. An event i is anything for which audienceship and/or people's presence is to be measured. An event for an audience can be, for example, visiting a particular website, accessing a particular advertisement, visiting a particular store, etc. The audience can further be divided into marginal audiences based on categories. In the context of digital media access, categories defining marginal audiences can be, for example, device type (e.g., desktop computing device, mobile device, tablet, etc.), browser (e.g., Google Chrome, Safari, etc.), etc. That is, a marginal audience is a more granular division of audience members. For example, an audience size of accessing websites (e.g., the event) includes quantities of audience members who visited website A via desktop computers, quantities of audience members who visited website A via mobile devices (e.g., smartphones), quantities of audience members who visited website B via desktop computers, and quantities of audience members who visited website B via mobile devices. As such, the audience can be divided into marginal audiences with respect to categories of website (e.g., websites A and B) and platform (e.g., desktop computer and mobile device). In such example, the marginal audiences include each combination of website and platform (e.g., (website A, desktop), (website A, mobile), (website B, desktop), (website B, mobile), etc.).

As used herein, a union, N, is the unique audience across all categories of the marginal audiences. In the example described above, the union is the unique audience across all websites and platforms (e.g., website A or website B, desktop or mobile). In examples disclosed herein, union and total unique audience are used interchangeably.

As used herein, a subunion, U', is the audience of a union of subsets of the audience. That is, the subunion is the combination of one or more marginal audiences. For example, a subunion of website and platform can be (all websites, desktop) (e.g., the combination of audience members who accessed website A or website B on their desktop). Additional subunions of website and platform can include (all websites, mobile), (website A, all platforms), (website B, all platforms), etc.

In examples disclosed herein, there are three relations to satisfy for logical consistency. The first relation is illustrated below.

$$\max\{M_i\} \le N \le \min\left\{U, \sum_i \{M_i\}\right\}$$

The variable i is the index of the $i^{th}$ marginal audience (e.g., with respect to website and platform). The left-hand side of the relation (e.g., $\max\{M_i\} \le N$) defines that the maximum marginal audience size, $M_i$, must be less than or equal to the union of marginal audiences, N. That is, the largest marginal audience size cannot be greater than the union of all of the marginal audiences (e.g., the total unique audience). The right-hand side of the relation (e.g., $N \le \min\{U, \Sigma_i\{M_i\}\}$) defines that the union of the marginal audiences must be less than or equal to the minimum of the universe estimate, U, or the sum of the marginal audience sizes. That is, the union of the marginal audiences cannot be greater than the universe estimate and a person can be a member of more than one marginal audience. For example, a person can visit website A on their desktop (e.g., (website A, desktop)) and visit website B on their desktop (e.g., (website B, desktop)). Thus, the person will account for one count of the union and two counts in the sum of marginal audiences.

The second relation is illustrated below.

$$\max\{M_j\} \le U' \le \min\left\{U, \sum_j \{M_j\}\right\}$$

The variable j is the $j^{th}$ subset of marginal audiences that belong to the subunion U'. The left-hand side (e.g., $\max\{M_j\} \le U'$) of the second relation defines that the maximum marginal audience must be less than or equal to the subunion of the marginal audiences. For example, if the subunion is U'=(all websites, desktop), the marginal audiences of such a subunion are (website A, desktop), (website B, desktop), etc. Thus, by definition, the marginal audiences are part of the subunion. For example, an audience member in (website A, desktop) is in the subunion of all websites (e.g., (all websites, desktop)). The right-hand side of the second relation (e.g., $U' \le \min\{U, \Sigma_j\{M_j\}\}$) defines that the subunion of the marginal audience must be less than or equal to the minimum of the universe estimate, U, or the sum of all of the marginal audiences. As described above, an audience member can be a member of more than one marginal audience.

The third relation is illustrated below.

$$U' \le N$$

The third relation defines that the subunion of marginal audiences must be less than or equal to the union of marginal audiences. That is, the subunion of a marginal audience must be less than or equal to the union (e.g., the total unique audience). For example, if the selected subunion is (all websites, desktop), the union further includes (all websites, all platforms) (e.g., the subunions corresponding to all platforms is not accounted for in the selected subunion).

In some examples, an AME tracks impression counts of panelists (e.g., panel impressions). That is, an AME can track panel impression counts and corresponding panel audience sizes of the impression counts of an event. For example, an AME can monitor a home, such as a "Nielsen family," that has been statistically selected to develop media (e.g., television) ratings data for a population/demographic of interest. The monitored home can include panelists that have been statistically selected to develop media ratings data (e.g., television ratings data) for a population/demographic of interest. People become panelists via, for example, a user interface presented on a media device. People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In examples disclosed herein, panelists of the household have registered with an AME (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. In some examples, the example media presentation environment is a household. The example media presentation environment can additionally or alternatively be any other type(s) of environments such as, for example, a theater, a restaurant, a tavern, a retail location, an arena, etc.

In some examples, an AME additionally or alternatively tracks census impressions. As used herein, a census impression (e.g., a census impression) is an impression that is logged for an access to media by a user for which demographic information is unknown. Thus, a census impression is indicative of an access to media but not indicative of the audience member to which the access should be attributed. As such, census impressions are logged as anonymous accesses to media by an AME to generate impression counts for media. Since the census impressions are anonymous, they are not directly indicative of total unique audience sizes because multiple census impression counts may be attributed to the same person (e.g., the same person visits the same website multiple times and/or visits multiple different websites that present the same advertisement, and each presentation of that advertisement is reported as a separate impression, albeit for the same person). For example, an AME obtains impression counts from database proprietors. However, as described above, census impression counts lack demographic information and/or user identification. Thus, while an AME can track census impression counts of a universe audience, the AME does not know census audience size. As used herein, a universe audience (also referred to as a total audience) for media is a total number of unique persons that accessed the media in a particular geographic scope of interests for audience metrics, via one or more websites/webpages, via one or more internet domains, and/or during a duration of interest for audience metrics. Example geographic scopes of interest could be a city, a metropolitan area, a state, a country, etc. That is, the AME does not know the corresponding unique audience of the census impression counts. This makes reach difficult to measure on the census.

Examples disclosed herein estimate audience size of a universe audience for media based on panel and census audience metrics information collected by an AME. For example, the panel and census data include panel audience sizes, panel impression counts, and census impression counts but does not include census audience sizes. Examples disclosed herein estimate census audience sizes based on panel impression counts, panel audience sizes, and census impressions. Examples disclosed herein estimate census audience sizes of events (e.g., viewing particular media, visiting particular websites, etc.), census marginal audience sizes, and/or census subunion audience sizes (e.g., audience sizes of the subunion of marginal audiences).

FIG. 1 illustrates an example audience estimation system 100 constructed in accordance with teachings of this disclosure for audience and impression deduplication. The example audience estimation system 100 includes an example panel database 102, an example census database 104, an example network 106, and an example data center 108 that implements an example audience estimator 110 to de-duplicate audience impression counts and estimate audience size. The example data center 108 may be owned and/or operated by an AME, a database proprietor, a media provider, etc.

As used herein, a media impression is defined as an occurrence of access and/or exposure to media (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, media may be content and/or advertisements. Examples disclosed herein are not restricted for use with any particular type of media. On the contrary, examples disclosed herein may be implemented in connection with tracking impressions for media of any type or form.

In the illustrated example of FIG. 1, the panel database 102 stores panelist data obtained by an AME using panel meters located at panelist sites. For example, the panelist data can include monitoring data representative of media content exposed to a panelist. That is, the panel database 102 stores panel data including panel audience sizes and panel impression counts. In some examples, the panel database 102 stores panel data for particular events. For example, the panel database 102 stores a panel impression count and a panel audience size for a first website, a panel impression count and a panel audience size for a second website, etc. Additionally or alternatively, the panel database 102 stores panel data corresponding to marginal audiences. For example, the panel database 102 stores a panel impression count and a panel audience size for an audience of the marginal (website A, desktop), a panel impression count and a panel audience size for an audience of the marginal (website B, desktop), etc. In some examples, the panel database 102 stores the total panel impression count of events, the total panel audience size of events, the union panel impression count of marginal audiences, and/or the union panel audience size of the marginal audiences.

The example census database 104 of the illustrated example of FIG. 1 stores census data obtained by an AME. For example, the census database 104 can include data from a database proprietor (e.g., Facebook, Instagram, etc.). In some examples, the data stored in the census database 104 includes data from a relatively larger sample size compared to the panel data stored in the panel database 102. In examples disclosed herein, the census database 104 stores census impression counts. In some examples, the census database 104 stores census impression counts for particular events. For example, the census database 104 stores a census impression count for a first website, a census impression count for a second website, etc. Additionally or alternatively, the census database 104 stores census data corresponding to marginal audiences. For example, the census database 104 stores a census impression count corresponding to an audience of the marginal (website A, desktop), a census impression count corresponding to an audience of the marginal (website B, desktop), etc. In some examples, the census database 104 stores the total census impression count of events, the total census audience size of events, the union census impression count of marginal audiences, and/or the union census audience size of the marginal audiences.

The example network 106 of the illustrated example of FIG. 1 is a wide area network (WAN) such as the Internet. However, in some examples, local networks may additionally or alternatively be used. Moreover, the example network 106 may be implemented using any type of public or private network, such as, but not limited to, the Internet, a telephone network, a local area network (LAN), a cable network, and/or a wireless network, or any combination thereof.

In the illustrated example of FIG. 1, the data center 108 communicates with the panel database 102 and the census database 104 through the network 106. In some examples, the data center 108 contains the audience estimator 110. In the illustrated example of FIG. 1, the data center 108 is an execution environment used to implement the audience estimator 110. In some examples, the data center 108 is associated with a media monitoring entity (e.g., an AME, etc.). In some examples, the data center 108 can be a physical processing center (e.g., a central facility of the media monitoring entity, etc.). Additionally or alternatively, the data center 108 can be implemented via a cloud service (e.g., AWS, etc.). In this example, the data center 108 can further store and process panel data and census data.

The example audience estimator 110 of the illustrated example of FIG. 1 estimates census audience sizes of events, marginal audiences, and/or subunions of marginal audiences. In some examples, the audience estimator 110 accesses and obtains panel data from the panel database 102 (e.g., panel impression counts, panel audience sizes) and/or census data from the census database 104 (e.g., census impression counts). The audience estimator 110 determines a deduplicated census audience size based on the panel data and the census data. The example audience estimator 110 is described below in connection with FIG. 2. In some examples, the audience estimator 110 is an application-specific integrated circuit (ASIC), and in some examples the audience estimator 110 is a field programmable gate array (FPGA). Alternatively, the audience estimator 110 can be software located in the firmware of the data center 108.

Figure 2:
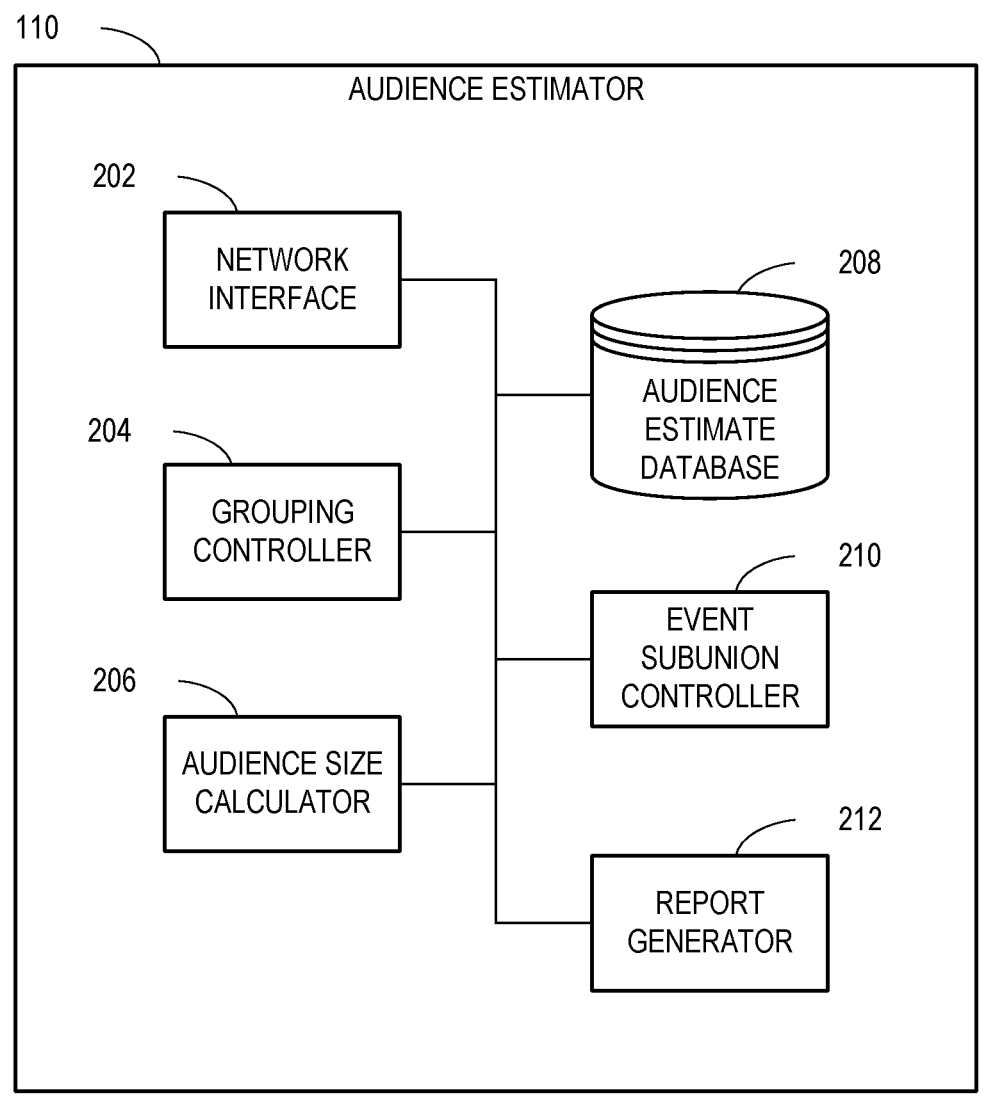
FIG. 2 is a block diagram of an example audience estimator of FIG. 1.

FIG. 2 is a block diagram of an example audience estimator 110 of FIG. 1. The example audience estimator 110 includes an example network interface 202, an example grouping controller 204, an example audience size calculator 206, an example audience estimate database 208, an example event subunion controller 210, and an example report generator 212.

The network interface 202 of the illustrated example of FIG. 2 is provided to allow the audience estimator 110 to receive panel data and/or census data from the example network 106 of FIG. 1. In some examples, the network interface 202 can be continuously connected to the network 106, the panel database 102, and/or the census database 104 for communication with the network 106, the panel database 102, and/or the census database 104. In other examples, the network interface 202 can be periodically or aperiodically connected for periodic or aperiodic communication with the network 106, the panel database 102, and/or the census database 104. In some examples, the network interface 202 can be absent.

The example grouping controller 204 of the illustrated example of FIG. 2 groups panel data and/or census data based on demographic. For example, the panel data can include demographic information corresponding to panelists (e.g., gender, age, location, etc.). In some examples, demographic information of panel data can be imputed to census data. For example, the grouping controller 204 groups census data based on census audience size estimates of demographic groups. That is, the audience size calculator 206 determines census audience sizes of demographic groups based on grouped panel data. In examples disclosed herein, the demographic information of the panel data and/or census data is independent of each other (e.g., there is no duplication of an audience member between demographic groups). For example, panel data and census data for females between the ages of 0-12 are grouped together, panel data and census data for females between the ages of 13-18 are grouped together, etc. Thus, the audience estimator 110 can process and estimate census audience sizes for one or more demographic groups concurrently based on the panel data.

The example audience size calculator 206 of the illustrated example of FIG. 2 determines audience size estimates for census data. That is, the example audience size calculator 206 determines census audience sizes for events, marginal audiences, and/or subunions of marginal audiences. In examples disclosed herein, there are n+2 constraints, where n is the number of events. That is, there are n constraints from each respective event audience (e.g., $z_j$ j={1, ..., n}), a constraint for total audience (e.g., $z_\bullet$), and a constraint for total normalized audience to 100% (e.g., $z_0$). Each constraint has a Lagrange Multiplier, which can be expressed in multiplicative form in terms of the unknown variables as shown in example Equations 1a, 1b, and 1c.

$$z_0 z \cdot z_j \prod_{\substack{k=1 \\ k \neq j}}^{n} (1+z_j) = A_j \quad j = \{1, 2, \ldots, n\} \quad \text{(Equation 1a)}$$

$$z_0 z \cdot \left( \prod_{k=1}^{n} (1+z_j) - 1 \right) = A. \quad \text{(Equation 1b)}$$

$$z_0 + z_0 z \cdot \left( \prod_{k=1}^{n} (1+z_j) - 1 \right) = 1 \quad \text{(Equation 1c)}$$

The variable $A_j$ is the proportion of people in the marginal audience of the $j^{th}$ event such that the sum is normalized to 100% relative to the universe estimate, U. The variable $A_\bullet$ is the proportion of the total unique audience size such that the sum is normalized to 100% with respect to the universe estimate. For example, if U=200 (e.g., the universe estimate is 200 people) and $A_j$=0.3 (e.g., the proportion of people in the audience of the $j^{th}$ event is 30% of the universe estimate), then the audience size of the $j^{th}$ event is 60 people.

Solving example Equations 1a-c for $z_j$, $z_\bullet$, and $z_0$ produces example Equations 2a, 2b, and 2c below.

$$z_j = \frac{A_j}{Q - A_j} \quad j = \{1, 2, \ldots, n\} \quad \text{(Equation 2a)}$$

$$z_* = \frac{Q - A.}{1 - A.} \quad \text{(Equation 2b)}$$

$$z_0 = 1 - A. \quad \text{(Equation 2c)}$$

The variable Q is the pseudo-universe estimate. That is, the variable Q is what the universe estimate, U, would be to predict the panel data and census data assuming independence.

Thus, Q can be solved for using example Equation 3 below.

$$1 - \frac{A.}{Q} = \prod_{j=1}^{n} \left(1 - \frac{A_j}{Q}\right) \quad \text{(Equation 3)}$$

As described above, an individual that is a member of an event (e.g., viewed a television show, accessed a webpage, etc.) corresponds to at least one impression count. In examples disclosed herein, the audience size is normalized by the population (e.g., example Equation 1c). Thus, the impression count is also normalized by the population. For example, the network interface 202 may receive data from the panel database 102 including a panel impression count of 60 impressions, a panel audience size of 20 people, and a total population of 50 people. In such an example, the audience constraint is 40% (e.g., 20/50=0.4) while the impression constraint is 1.2 (e.g., 60/50=1.2).

In examples disclosed herein, the panel database 102 and the census database 104 include impression counts for each event. That is, the panel database 102 includes a panel impression count for each event and the census database 104 includes a census impression count for each event. Thus, if $z_j$ is the audience-only multiplier (e.g., audience size) and the set $\{z_j^{(a)}, z_j^{(i)}\}$ are multipliers for splitting the audience into different impressions, an equality can be written as shown in Equation 4 below.

$$z_j = z_j^{(a)}(z_j^{(i)})^1 + z_j^{(a)}(z_j^{(i)})^2 + z_j^{(a)}(z_j^{(i)})^3 = z_j^{(a)} \sum_{k=1}^{\infty} (z_j^{(i)})^k = z_j^{(a)} \left(\frac{z_j^{(i)}}{1 - z_j^{(i)}}\right) \quad \text{(Equation 4)}$$

As described above, the variable $z_j^{(a)}$ is the event audience constraint and the variable $z_j^{(i)}$ is the event impression constraint. That is, the left-hand side of the example Equation 4 is the Lagrange Multiplier for the audience of $j^{th}$ event. The right-hand side of the example Equation 4 represents a partition, summing across all possible impressions that belong to the $j^{th}$ event. Thus, the information contained in the collection of the subsets of impressions is identical to only having access to audience-only information in this example.

The example Equation 2a (e.g., solving for $z_j$) can be substituted into Equation 4, producing Equation 5 below.

$$\frac{A_j}{Q - A_j} = z_j^{(a)} \left(\frac{z_j^{(i)}}{1 - z_j^{(i)}}\right) \quad j = \{1, 2, \ldots, n\} \quad \text{(Equation 5)}$$

Multiplying the formula for $A_j$ by a frequency value of impressions per audience produces the known impression constraint. Thus, the frequency value is a function of $z_j^{(i)}$ and can be determined by the ratio of two geometric series as shown in Equations 6a and 6b below.

$$\sum_{k=1}^{\infty} k(z_j^{(i)})^k = \frac{z_j^{(i)}}{(1 - z_j^{(i)})^2} \quad \text{(Equation 6a)}$$

$$\sum_{k=1}^{\infty} (z_j^{(i)})^k = \frac{z_j^{(i)}}{(1 - z_j^{(i)})^2} \quad \text{(Equation 6b)}$$

As described above, the right-hand side of Equation 6a is the total number of impressions.

Returning to Equation 1a, the terms in the constraints for $A_j$ are multiplicative and linear. Thus, using the distributive property, the ratio between the example Equation 1a and the example Equation 6b is equivalent to the frequency of impressions. The frequency of impressions can be defined as shown in example Equation 7 below.

$$\frac{1}{1 - z_j^{(i)}} = \frac{R_j}{A_j} \quad j = \{1, 2, \ldots, n\} \quad \text{(Equation 7)}$$

The variable $R_j$ is the known total impression count for each event j (e.g., $R_j$ for j={1, 2, ..., n}). Example Equation 7 can be rearranged as shown in example Equation 8 below.

$$z_j^{(i)} = 1 - \frac{A_j}{R_j} \quad j = \{1, 2, \ldots, n\} \quad \text{(Equation 8)}$$

Thus, Equation 8 can be substituted into Equation 5, and solving for $z_j^{(a)}$ produces example Equation 9 below.

$$z_j^{(a)} = \frac{A_j^2}{(Q - A_j)(R_j - A_j)} \quad \text{(Equation 9)}$$

Returning to Equation 4, the term $$\frac{z_j^{(i)}}{1 - z_j^{(i)}},$$

when simplified, is equivalent to $f_j - 1$, wherein $f_j$ is the frequency of an impression of the $j^{th}$ event such that $$f_j = \frac{R_j}{A_j}.$$

That is, the term $f_j-1$ is one less than the frequency of an impression. Therefore, Equation 10 is expressed as follows.

$$z_j = z_j^{(a)}(f_j-1) \, j=\{1,2,\ldots,n\} \quad \text{(Equation 10)}$$

As shown in Equation 10, it is not the frequency which determines the $z_j$ constraint, but the residual frequency after one is subtracted. For example, if a person is counted in the audience size of an event, the person must have at least one impression count in that event. Thus, the minimum frequency of being in the event is one and not zero.

In summary, there are four equations of the model, shown in example Equations 11a, 11b, 11c, and 11d below.

$$z_0 z_\bullet z_j \prod_{\substack{k=1 \\ k \neq j}}^{n}(1+z_j) = A_j \quad j=\{1,2,\ldots,n\} \quad \text{(Equation 11a)}$$

$$\left(\frac{1}{1-z_j^{(i)}}\right) z_0 z_\bullet z_j \prod_{\substack{k=1 \\ k \neq j}}^{n}(1+z_j) = R_j \quad \text{(Equation 11b)}$$

$$j=\{1,2,\ldots,n\}$$

$$z_0 z_\bullet \left(\prod_{k=1}^{n}(1+z_j) - 1\right) = A_\bullet \quad \text{(Equation 11c)}$$

$$z_0 + z_0 z_\bullet \left(\prod_{k=1}^{n}(1+z_j) - 1\right) = 1 \quad \text{(Equation 11d)}$$

Rearranging Equation 10 results in example Equation 12 below.

$$z_j = z_j^{(a)}\left(\frac{z_j^{(i)}}{1-z_j^{(i)}}\right) \quad \text{(Equation 12)}$$

Solving for the four constraints produces example Equations 13a, 13b, 13c, and 13d below.

$$z_j^{(a)} = \frac{A_j^2}{(Q-A_j)(R_j-A_j)} \quad j=\{1,2,\ldots,n\} \quad \text{(Equation 13a)}$$

$$z_j^{(i)} = 1 - \frac{A_j}{R_j} \quad j=\{1,2,\ldots,n\} \quad \text{(Equation 13b)}$$

$$z_\bullet = \frac{Q-A_\bullet}{1-A_\bullet} \quad \text{(Equation 13c)}$$

$$z_0 = 1 - A_\bullet \quad \text{(Equation 13c)}$$

Example Equation 14 below can be used to determine Q.

$$1 - \frac{A_\bullet}{Q} = \prod_{j=1}^{n}\left(1 - \frac{A_j}{Q}\right) \quad \text{(Equation 14)}$$

That is, the example audience size calculator 206 can use example Equation 14 to determine the pseudo-universe estimate (e.g., Q).

In examples disclosed herein, multipliers of the unknown constraints (e.g., the audience constraints, $z_j^{(a)}$) in the census data must equal the same multipliers for the panel data. This equality is illustrated in example Equation 15 below.

$$\{z_j^{(a)}\}P = \{z_j^{(a)}\}C \, j=\{1,2,\ldots,n\} \quad \text{(Equation 15)}$$

That is, the set of unknowns, $z_j^{(a)}$, within the panel, P, must equal the same set of unknowns within the census, C. Thus, substituting example Equation 13a into example Equation 15 produces example Equation 16 below.

$$\frac{A_j^2}{(Q_P-A_j)(R_j-A_j)} = \frac{X_j^2}{(Q_C-X_j)(T_j-X_j)} \quad \text{(Equation 16)}$$

$$j=\{1,2,\ldots,n\}$$

As described above, the variables {A, R} describe audience and impressions of the panel, respectively. The variables {X, T} describe audience and impressions of the census, respectively.

The subscripts of the variable Q represent the two different populations: panel, P, and census, C. Using example Equation 14, $Q_p$ can be solved as shown in example Equation 17 below.

$$1 - \frac{A_\bullet}{Q_P} = \prod_{i=1}^{n}\left(1 - \frac{A_i}{Q_P}\right) \quad \text{(Equation 17)}$$

That is, the example network interface 202 receives values for $A_\bullet$ (e.g., the total panel audience size) and $A_i$ (e.g., the panel audience sizes for the i events) from the panel database 102 (FIG. 1). Thus, the example audience size calculator 206 can determine the value of $Q_P$ using example Equation 17.

The audience size calculator 206 can then solve the right-hand side of the example Equation 16, resulting in example Equation 18 below.

$$\# = \frac{X_j^2}{(Q_C-X_j)(T_j-X_j)} \quad \text{(Equation 18)}$$

Wherein the symbol # is the numeric value of the right-hand side of example Equation 16. Thus, two unknown variables remain in example Equation 18 (e.g., the example network interface 202 receives values for census impression counts $T_j$). Using example Equation 14 and solving for $X_j$ produces a function of $X_j$ in terms of $Q_C$, illustrated in example Equation 19 below.

$$1 - \frac{X_\bullet}{Q_C} = \prod_{j=1}^{n}\left(1 - \frac{X_j}{Q_C}\right) \quad \text{(Equation 19)}$$

Thus, there is now a system of two equations (e.g., example Equation 18 and example Equation 19) with two unknown variables. The example audience size calculator 206 determines the census audience sizes, $X_j$, using example Equations 18 and 19.

In some examples, an AME is also interested in determining subunion census audience size of marginal audiences in addition to determining the union census audience sizes of events (e.g., $X_j$). For example, there is a conserved relationship between the total union and marginal audiences. For example, Equation 17 and Equation 19 can be re-written as shown in example Equation 20a and example Equation 20b below.

$$1 - \frac{A_d}{Q_A} = \prod_k \left(1 - \frac{A_k}{Q_A}\right) \quad \text{(Equation 20a)}$$

$$1 - \frac{X_d}{Q_X} = \prod_k \left(1 - \frac{X_k}{Q_X}\right) \quad \text{(Equation 20b)}$$

As described above, Q is a parameter that represents the pseudo-universe estimate, wherein $Q_A$ is the pseudo-universe estimate associated with the panel and $Q_X$ is the pseudo-universe estimate associated with the census. In some examples, the panel data and the census data can have the same universe estimate, U. However, $Q_A$ and $Q_X$ can have different values due to differences in audience duplication between panel and census data across different categories (e.g., platforms). The variable $A_d$ is the deduplicated total audience size (e.g., the total union audience size) of the panel and the variable $X_d$ is the deduplicated total audience size of the census. In comparison to example Equations 17 and 19, $A_d$ is equivalent to $A_\bullet$ and $X_d$ is equivalent to $X_\bullet$. The variable $A_k$ is the marginal audience size of the $k^{th}$ category (e.g., platform, browser, etc.) of the panel and $X_k$ is the marginal audience size of the $k^{th}$ category of the census.

In examples disclosed herein, there is a conserved metric between panel data and census data. For example, Equation 16 can be rewritten as shown in example Equation 21 below.

$$z = \frac{A^2}{(Q-A)(R-A)} = \frac{X^2}{(Q-X)(T-X)} \quad \text{(Equation 21)}$$

In example Equation 21, z is the conserved constant between panel data and census data.

In some examples, the network interface 202 does not receive a total census audience size, $X_d$, from the census database 104 (FIG. 1). In such examples, the audience size calculator 206 determines an estimate of the total census audience size. The example audience size calculator 206 determines a frequency factor (e.g., the variable f described above) using panel impression counts divided by panel audience size (e.g., $$\frac{\sum_k R_k}{A_d}\right).$$

The example audience size calculator 206 uses example Equation 22 below to determine the total census audience size, $X_d$.

$$X_d = \frac{A_d \sum_k T_k}{\sum_k R_k} \quad \text{(Equation 22)}$$

That is, the example audience size calculator 206 applies the frequency factor to the total census impression count (e.g., $\sum_k T_k$) to determine the total census audience size.

The example audience size calculator 206 uses example Equation 20a to determine a value of $Q_A$ based on the total panel audience size, $A_d$, and the panel audience sizes, $A_k$. Example Equation 21 can be rearranged to produce example Equation 23, illustrated below, to determine a value of $z_k$.

$$z_k = \frac{A_k^2}{(Q_A - A_k)(R_k - A_k)} \quad \text{(Equation 23)}$$

That is, the example audience size calculator 206 determines a set of values $z_k$ for each marginal audience k.

Example Equation 21 and example Equation 23 can be combined as shown in example Equation 24 below.

$$z_k = \frac{X_k^2}{(Q_X - X_k)(T_k - X_k)} \quad \text{(Equation 24)}$$

Example Equation 24 can be rearranged as shown in example Equation 25 below.

$$(z_k-1)X_k^2 - z_k(Q_X+T_k)X_k + z_k Q_X T_k = 0 \quad \text{(Equation 25)}$$

Using the quadratic formula and solving for $X_k$, Equation 25 can be rewritten as shown in example Equation 26 below.

$$X_k = \frac{b \pm \sqrt{b^2 - 4ac}}{2a} \quad \text{(Equation 26)}$$

In example Equation 26, $a = z_k - 1$, $b = z_k(Q_k + T_k)$, and $c = z_k Q_X T_k$. Example Equation 26 can be further simplified by taking only the positive solution (e.g., $$X_k = \frac{b + \sqrt{b^2 - 4ac}}{2a}\right).$$

That is, the census audience size must be a positive number. Thus, the example audience size calculator 206 determines $Q_X$ and $X_k$ using example Equation 20b and example Equation 26. That is, the two remaining unknown variables, $Q_X$ and $X_k$, can be solved using the system of two equations (e.g., example Equations 20b and 26).

Example Equation 20b can be rewritten as shown in example Equation 27 below.

$$1 - \frac{X_d'}{Q_X} = \prod_k \left(1 - \frac{X_k'}{Q_X}\right) \quad \text{(Equation 27)}$$

In example Equation 27, $X'_k$ is the subset of marginal audiences within the subunion. Example Equation 27 can be rearranged as shown in example Equation 28 below.

$$X_d' = Q_X \left(1 - \prod_k \left(1 - \frac{X_k'}{Q_X}\right)\right) \quad \text{(Equation 28)}$$

The example audience size calculator 206 determines subunion census audience sizes using the example Equation 28. For example, if there are three marginal audiences A, B, and C, the audience size calculator 206 can determine three subunion census audience sizes AB, AC, and BC as shown in example Equation 29a, 29b, and 29c below.

$$X_d^{(AB)} = Q_X \left(1 - \left(1 - \frac{X_1}{Q_X}\right)\left(1 - \frac{X_2}{Q_X}\right)\right) \quad \text{(Equation 29a)}$$

$$X_d^{(AC)} = Q_X \left(1 - \left(1 - \frac{X_1}{Q_X}\right)\left(1 - \frac{X_3}{Q_X}\right)\right) \quad \text{(Equation 29b)}$$

$$X_d^{(BC)} = Q_X \left(1 - \left(1 - \frac{X_2}{Q_X}\right)\left(1 - \frac{X_3}{Q_X}\right)\right) \quad \text{(Equation 29c)}$$

In the example Equations 29a, 29b, 29c, the variable $X_1$ corresponds to the marginal audience A, $X_2$ corresponds to the marginal audience B, and $X_3$ corresponds to the marginal audience C.

Although examples disclosed herein are described in connection with estimating census audience sizes for multiple events in which each event is a separate dimension, examples disclosed herein may also be used to estimate census audience size for a single dimension (e.g., a single event).

In examples of one dimension, example Equation 16 can be rewritten as shown in example Equation 30 below.

$$\frac{A^2}{(U-A)(R-A)} = \frac{X^2}{(T-X)(U-X)} \quad \text{(Equation 30)}$$

When there is only one dimension (e.g., j=1), there is a non duplicated audience because there is no possibility of any individual being double counted in any single event. Thus, an actual universe estimate, U, is used instead of the pseudo-universe estimate, Q, which was used to account for possible double-counting for multiple dimension cases. When the dimension index, j, is removed, Equation 30 can be rewritten as Equation 31 below, which is a representation of Equation 13a with Q defined as shown in Equation 14.

$$z^a = \frac{A^2}{(U-A)(R-A)} \quad \text{(Equation 31)}$$

As $z^a$ is the multiplier for the audience constraint, and examples disclosed herein estimate the census audience, the equivalent expression in terms of census variables equals the same value. As such, Equation 31 is the equivalent to Equation 30.

For single dimension cases in which Equation 30 and/or Equation 31 is/are used to solve for an unknown census audience estimate, only a single aggregate collection of group of people is considered, which could be, for example either a single demographic, the entire population, or some other collective group treated as a whole. In such examples, no partitioning into mutually exclusive groups (e.g., marginal audiences) is considered in this methodology.

Additionally, it is one dimensional in terms of what the data represents. If the impressions were across multiple websites, for example, any individual could visit any combination of websites any number of times creating a multiple dimensional array of possibilities to consider. The single dimension methodology is considering only the total impressions and/or durations across a collective group of entities, or a single entity by itself (e.g., a group of one). While these assumptions at first may seem a reductionist view of real-world scenarios, the single dimension methodology gives a quick first order estimate of estimated census audience.

In examples disclosed herein, impressions are discrete counts of events and an individual is a member of the audience if they have at least one impression. This yields the property that the impression counts must be at least as large as the audience.

The single dimension Equation 30 uses the following variable notation:

|  | Database Proprietor (Panel) | Census |
| --- | --- | --- |
| Audience | A | X |
| Impressions | R | T |
| Universe Estimate | U | U |

Although the same variable U is used for both, they can in theory be different with $U_1$ and $U_2$. In most cases the data from the panel data is weighted to the population to correct any sampling bias. This would make the universe estimate the same for both and the weighted-audience estimate is corrected to account for known census values not considered in the panel data.

The example audience estimate database 208 of FIG. 2 stores panel data and census data. For example, the audience estimate database 208 stores panel impression counts, panel audience sizes, and/or census impression counts received from the panel database 102 (FIG. 1) and the census database 104 (FIG. 1) via the network interface 202. The example audience estimate database 208 can also store the census audience sizes determined by the example audience size calculator 206. Additionally or alternatively, the example audience estimate database 208 stores marginal census audience sizes and/or subunion census audience sizes. However, other data may additionally and/or alternatively be stored by the audience estimate database 208. The audience estimate database 208 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example audience estimate database 208 may be in any format such as, for example, binary data, comma delimited data, tab delimitated data, structured query language (SQL) structures, etc. While, in the illustrated example of FIG. 2, the audience estimate database 208 is illustrated as a single device, the audience estimate database 208 and/or any other data storage devices described herein may be implemented by any number and/or type(s) of storage devices.

The example event subunion controller 210 of FIG. 2 determines subunions to estimate audience size. That is, the example event subunion controller 210 determines combinations of marginal audiences (e.g., event subunions). For example, an AME may only be interested in determining a total census audience size. In such examples, the example event subunion controller 210 identifies the union across every category (e.g., the union, N). In some examples, the event subunion controller 210 identifies one or more unions of subsets of the marginal audiences. For example, the event subunion controller 210 identifies four subsets of marginal audiences corresponding to two different websites and two different platforms: (website A, desktop), (website A, mobile), (website B, desktop), and (website B, mobile). The event subunion controller 210 can determine unions of the subsets (e.g., subunions): (all websites, desktop), (all websites, mobile), (website A, all platforms), and (website B, all platforms). In some examples, the event subunion controller 210 determines to estimate census audience size of all subunions (e.g., all possible combinations of events and categories). In some examples, the event subunion controller 210 determines to estimate census audience sizes of some subunions.

The example report generator 212 of FIG. 2 generates an output including data stored in the example audience estimate database 208. For example, the report generator 212 generates a report including census audience size for one or more events. In some examples, the report generator 212 generates a report including census audience sizes for subunions of marginal audiences.

In examples disclosed herein, the network interface 202 may implement means for receiving panel data and/or census data. The example grouping controller 204 may implement means for grouping panel data and census data. The example audience size calculator 206 may implement means for calculating a census audience size and/or a plurality of subunion census audience sizes. The example audience estimate database 208 may implement means for storing panel data and census data. The example event subunion controller 210 may implement means for determining a subunion of marginal audiences. The example report generator 212 may implement means for generating a report.

FIG. 3A is a table 300 showing example panel impression counts 302, example panel audience sizes 304, and example census impression counts 306. That is, the panel impression counts 302 correspond to the variable Rj, the panel audience sizes 304 correspond to the variable $A_j$, and the census impression counts 306 correspond to the variable $T_j$, where j represents respective events. For example, the network interface 202 can receive the panel impression counts 302 and the panel audience size 304 from the panel database 102 (FIG. 1). Additionally or alternatively, the network interface 202 can receive the census impression counts 306 from the example census database 104 (FIG. 1). The example table 300 includes an example first event 308, an example second event 310, an example third event 312, and an example fourth event 314. In the illustrated example of FIG. 3A, each of the events 308, 310, 312, 314 represents a visit to a corresponding website. For example, the first website 308 can be google.com, the second website 310 can be facebook.com, the third website 312 can be Instagram.com, and the fourth website 314 can be youtube.com.

As described above, an audience member of an event corresponds to at least one impression count of that event. For example, the first website 308 has a panel impression count of 4,000, a panel audience size of 3,000, and a census impression count of 5,000. The panel impression count of the event 308 is greater than the panel audience size of the event 308. Thus, at least one audience member of the example first event 308 visited the first website more than once. The example second website 310 has a panel impression count of 23,000, a panel audience size of 14,000, and a census impression count 30,000. The example third website 312 has a panel impression count of 14,000, a panel audience size of 10,000, and a census impression count of 20,0000. The example fourth website 314 has a panel impression count of 5,000, a panel audience size of 4,000, and a census impression count of 10,000.

The example table 300 includes an example total panel impression count 316, an example total panel audience size 318, an example total census impression count 320, and an example total census audience size 322. In the illustrated example, the total panel impression count 316 is the sum of the panel impression counts of the events 308, 310, 312, 314. That is, the total panel impression count 316 is 46,000 (e.g., 4,000+23,000+14,000+5,000=46,000). Similarly, the example total census impression count 320 is the sum of the census impression counts of the events 308, 310, 312, 314. That is, the example total census impression count 320 is 65,000 (e.g., 5,000+30,000+20,000+10,000=65,000). However, the example total panel audience size 318 is not the sum of the panel audience sizes of the events 308, 310, 312, 314. For example, 3,000+14,000+10,000+4,000≠25,000. In the illustrated example of FIG. 3A, the events 308, 310, 312, 314 are not mutually exclusive. That is, there can be overlap between the audience members of each event 308, 310, 312, 314. For example, an audience member of the example first event 308 can also be an audience member of the example second event 310, the example third event 312, and/or the example fourth event 314. That is, an audience member can visit multiple websites (e.g., the events 308, 310, 312, 314) any number of times.

The example table 300 includes the example total census audience size 322. In the illustrated example of FIG. 3A, the total census audience size 322 is 30,000. However, the example table 300 does not include census audience size for each event 308, 310, 312, 314. The example audience size calculator 206 (FIG. 2) determines census audience size estimates for each event 308, 310, 312, 314 based on the example panel impression counts 302, the example panel audience sizes 304, and the example census impression counts 306.

FIG. 3B is a table 350 showing example panel impression counts 302, example panel audience sizes 304, example census impression counts 306, and example census audience sizes 352. That is, the example audience size calculator 206 (FIG. 2) can use the panel data and the census data of the example table 300 (FIG. 3A) to determine the example first census audience size 354 of the example first event 308, the example second census audience size 356 of the example second event 310, the example third census audience size 358 of the example third event 312, and the example fourth census audience size 360 of example fourth event 314. While an AME is interested in the example total census audience size 322 (e.g., 30,000), additional insights into the respective events (e.g., the events 308, 310, 312, 314) can be accomplished by knowing how the example total census audience size 322 is distributed across the events (e.g., the census audience sizes 354, 356, 358, 360).

In the illustrated example of FIG. 3B, the example total panel audience size 318, $A_*$, is 25,000. The example panel audience sizes 304, $A_j$, are {3,000, 14,000, 10,000, 4,000}. Thus, the example audience size calculator 206 can use example Equation 17 to determine $Q_P$ is 49149.4 (e.g., $$1 - \frac{25,000}{Q_P} = \prod_{i=1}^{n}\left(1 - \frac{A_i}{Q_P}\right)$$

for $A_j$={3,000, 14,000, 10,000, 4,000}). The example audience size calculator 206 can use the value of $Q_P$ in example Equation 18 for the example first event 308, shown below.

$$0.195019 = \frac{X_1^2}{(Q_C - X_1)(5,000 - X_1)}$$

That is, the census impression count, $T_1$, of the example first event 308 is 5,000. The example audience size calculator 206 can then use example Equation 19 for each event to determine $Q_C$=49388.4 and the census audience sizes, $X_j$, are {3572, 16545.9, 12881.8, 6868.82}. That is, the example first census audience size 354 is 3,572, the example second census audience size 356 is 16,546, the example third census audience size 358 is 12,882, and the example fourth census audience size 360 is 6,869. In some examples, the audience size calculator 206 stores the census audience sizes 354, 356, 358, 360 in the example audience estimate database 208 (FIG. 2).

In the illustrated example of FIG. 3B, the census audience sizes 352 (e.g., $X_j$) are less than or equal to the example census impression counts 306 (e.g., $T_j$) for the events 308, 310, 312, 314. That is, as described above, an audience member of an event corresponds to at least one impression count of that event. Furthermore, each census audience size 354, 356, 358, 360 is less than or equal to the example total census audience size 322.

FIG. 4A is a table 400 showing example panel impression counts 402, example panel audience sizes 404, and example census impression counts 406. That is, the panel impression counts 402 correspond to $R_k$, the panel audience sizes 404 correspond to $A_k$, and the census impression counts 406 correspond to $T_k$. For example, the network interface 202 can receive the panel impression counts 402 and the panel audience size 404 from the panel database 102 (FIG. 1). Additionally or alternatively, the network interface 202 can receive the census impression counts 406 from the example census database 104 (FIG. 1). The example table 400 includes an example marginal A 408, an example marginal B 410, and an example third marginal C 412. In some examples, the categories for the marginal audiences are website and platform. For example, the marginal A 408 can be (website A, desktop), the marginal B 410 can be (website A, mobile), and the marginal C 412 can be (website B, desktop). The example table 400 does not include a fourth marginal corresponding to (website B, mobile). In such an example, the event subunion controller 210 (FIG. 2) identified the three marginals 408, 410, 412.

The example table 400 includes an example union ABC 414. That is, the example union ABC 414 is the union of the example marginal A 408, the example marginal B 410, and the example marginal C 412. Stated otherwise, the example union ABC 414 is the total universe audience.

As described above, an audience member of a marginal audience corresponds to at least one impression count of that marginal audience. For example, the marginal A 408 has a panel impression count of 200, a panel audience size of 100, and a census impression count of 400. The panel impression count of the example marginal A 408 is greater than the panel audience size of the marginal A 408. The example marginal B 410 has a panel impression count of 300, a panel audience size of 200, and a census impression count of 600. The example marginal C 412 has a panel impression count of 500, a panel audience size of 300, and a census impression count of 800.

The example table 400 includes an example total panel audience count 416 (e.g., $A_d$). That is, the example total panel audience count 416 corresponds to the union ABC 414. As described above, the panel audience size 404 for the marginals 408, 410, 412 may not be deduplicated. For example, the total panel audience size 416 is not the sum of the panel audience sizes of the marginals 408, 410, 412 (e.g., 100+200+300≠400). In the illustrated example of FIG. 4A, the marginals 408, 410, 412 are not mutually exclusive. That is, there can be overlap between the audience members of each marginal 408, 410, 412. For example, an audience member of the marginal A 408 can also be an audience member of the marginal B 410, and/or the marginal C 412 (e.g., a user that visited website A and website B, a user that accessed website A on a desktop and mobile, etc.).

In contrast to the example table 300 (FIG. 3A), the example table 400 does not include a total census audience size (e.g., $X_d$). That is, the table 400 does not include a total census audience size corresponding to the union ABC 414. The example table 400 does not include census audience size for each of the marginals 408, 410, 412. The example audience size calculator 206 (FIG. 2) determines census audience size estimates for each marginal 408, 410, 412 and/or total census audience size for the example union ABC 414 based on the panel impression counts 402, the panel audience sizes 404, and the census impression counts 406.

FIG. 4B is a table 450 showing example panel impression counts 402, example panel audience sizes 404, example census impression counts 406, and example census audience sizes 452. That is, the example audience size calculator 206 (FIG. 2) determines the example census audience sizes 452 using the panel data and the census data of the example table 400. For example, the audience size calculator 206 determines a total census audience size 454 of the union ABC 414, a first census audience size 456 of the marginal A 408, a second census audience size 458 of the marginal B 410, and a third census audience size 460 of the marginal C 412.

The example audience size calculator 206 determines the example total census audience size 454 (e.g., $X_d$) using example Equation 22. For example, $$X_d = \frac{400(400 + 600 + 800)}{200 + 300 + 500} = 720.$$

The example audience size calculator 206 determines a value of $Q_A$ using example Equation 20a and values from the table 450 (e.g., $A_d$=400 and $A_k$={100,200,300}). The example audience size calculator 206 determines $Q_A$=488.60. The example audience size calculator 206 determines a value of $z_k$ using example Equation 23 to determine $\vec{z}$={0.257,1.376,2.386}. The example audience size calculator 206 determines a value for $Q_x$ and $X_k$ using example Equations 26 and 20b. For example, the audience size calculator 206 determines $Q_x$=886.390 and $\vec{X}$={193,386,510}. Thus, the example table 450 includes census audience estimates 456, 458, 460 for the marginal audiences 408, 410, 412. The values of $X_k$ estimated by the audience size calculator 206 satisfy the first logical consistency requirement (e.g., max{193,386,510}<720<(193+386+510)=1088).

The example audience size calculator 206 can further determine census audience sizes of subunions of the marginal audiences (e.g., subunion census audience sizes). For example, the event subunion controller 210 determines which subunion audience sizes to estimate. The example event subunion controller 210 can select three subunions: AB (e.g., the union of the example marginal A 408 and the example marginal B 410), AC (e.g., the union of the example marginal A 408 and the example marginal C 412), and BC (e.g., the union of the example marginal B 410 and the example marginal C 412). The audience size calculator 206 can determine census audience sizes of the selected subunions using example Equations 29a, 29b, 29c. For example, the audience size calculator 206 determines $X_d^{(AB)}$=494, $X_d^{(AC)}$=592, and $X_d^{(BC)}$=674. Each subunion $X'_d$ is less than the union $X_d$, which satisfies the third logical consistency (e.g., 494, 592, 674<720). The example audience estimate database 208 stores the values determined by the audience size calculator 206 (e.g., $X_d$, $X_k$, and/or $X'_d$).

FIG. 5 is a table 500 showing example aggregate audience sizes 502 and impression counts 504. In some examples, the audience sizes 502 and the impression counts 504 correspond to panel data. The example table 500 includes example events 506 and an example category 508. In the illustrated example of FIG. 5, the events 506 are websites (e.g., example.com). The example category 508 is a platform (e.g., desktop, mobile, etc.). The example table 500 further includes example demographics 510 (e.g., (female, ages 2-12), (female, ages 13-18), etc.). In the illustrated example of FIG. 5, the grouping controller 204 (FIG. 2) groups the audience sizes 502 and the impression counts 504 based on the demographics 510. For example, the first marginal 512 corresponds to female audience members aged 2-12 who visited example.com on a desktop, the second marginal 514 corresponds to female audience members aged 2-12 who visited example.com on a mobile device, and the third marginal 516 corresponds to female audience members aged 13-18 who visited example.com on a mobile device. That is, the example grouping controller 204 divided audience members of the marginal audience (example.com, mobile) based on the demographics 510. For example, the marginal 514 and the marginal 516 both correspond to the marginal (example.com, mobile). However, the audience sizes 502 and the impression counts 504 of the marginal (example.com, mobile) are divided into two separate marginal audiences (e.g., the marginal 514 and the marginal 516) based on two demographic groups (e.g., females aged 2-12 and females aged 13-18). Similarly, the grouping controller 204 divided the example first union 518 and the example second union 520 based on the example demographics 510. That is, both the example first union 518 and the example second union 520 correspond to (all websites, all platforms). However, the example audience sizes 502 and the example impression counts 504 are divided into the first union 518 and the second union 520 based on the demographics 510 (e.g., females aged 2-12 and females aged 13-18).

In examples disclosed herein, the demographics 510 are independent of each other. That is, audience members of one demographic group cannot be a member of a second demographic group. For example, a female of age 7 only belongs to the females aged 2-12 group and not the females aged 13-18 group. Thus, the example audience size calculator 206 can process (e.g., determine census audience size estimates) of demographic groups concurrently. For example, the audience size calculator 206 can determine census audience size estimates of the second marginal 514 and the third marginal 516 concurrently because the two marginals 514, 516 correspond to separate demographic groups.

FIG. 6 shows results of a comparative analysis of FIG. 1 in two computing environments in which examples disclosed herein were separately implemented. The illustrated example of FIG. 6 illustrates an example table 600 representing an example first computing environment 602 and an example second computing environment 604. For example, the first computing environment 602 is Pandas and the second computing environment 604 is PySpark. The example table 600 includes an example number of parallel groups 606. For example, the parallel groups can correspond to demographic groups (e.g., independent groups). The example first computing environment 602 includes 3,800 of the example parallel groups 606. In prior techniques (not illustrated), the parallel groups 606 are processed one group at a time (e.g., using for loops) to divide the data into subgroups and determine audience estimates. In such examples, this can take 400 seconds (not illustrated) to process. In examples disclosed herein, the first computing environment 602 processes the parallel groups 606 concurrently and, thus, takes 12.76 seconds to estimate marginal audiences (e.g., illustrated in the example impute marginal time 608) using the first computing environment 602. With respect to prior techniques, the first computing environment 602 has approximately 3000% reduced time to estimate marginal audiences.

In some examples, the second computing environment 604 includes more processors than the first computing environment 602. The example table 600 includes the example average time 610 (e.g., the average time per parallel group). In the illustrated example of FIG. 6, the second computing environment 604 has more of the parallel groups 606 (e.g., 396,675) than the first computing environment 602 (e.g., 3,800). However, the second computing environment 604 has a lower average time (e.g., the average time 610) (e.g., 3.18) than the first computing environment 602 (e.g., 3.97).

Figure 7:
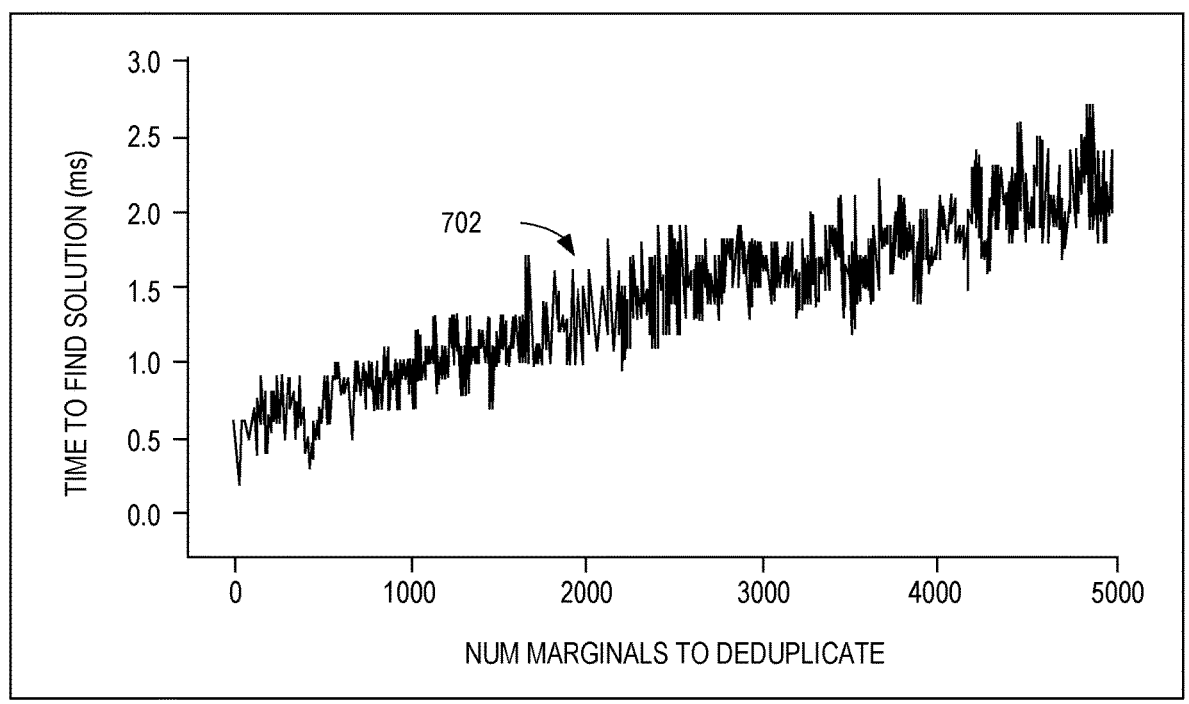
FIG. 7 is an example graph illustrating a performance of the audience estimator of FIG. 1.

FIG. 7 is an example graph 700 illustrating a performance of the audience estimator 110 of FIG. 1. In the illustrated example of FIG. 7, the x-axis is the number of marginal audiences to deduplicate. That is, the x-axis represents the number of marginal audience sizes to estimate. The y-axis of the example graph 700 represents the amount of time the example audience estimator 110 took to estimate the number of marginal audience sizes. In the illustrated example of FIG. 7, the graph 700 scales approximately linearly with respect to an increasing number of marginal audience sizes to estimate. For example, the graph 700 includes a data point 702 corresponding to 2,000 marginal audience sizes to estimate. In the illustrated example of FIG. 7, the example audience size calculator 206 (FIG. 2) takes approximately 1 millisecond to estimate 2,000 marginal audience sizes.

While an example manner of implementing the audience estimator 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example grouping controller 204, the example audience size calculator 206, the example audience estimate database 208, the example event subunion controller 210, the example report generator 212, and/or, more generally, the example audience estimator 110 of FIG. 2 may be implemented by hardware, software, firmware and/or any combination of hardware, software and/or firmware. Thus, for example, any of the example network interface 202, the example grouping controller 204, the example audience size calculator 206, the example audience estimate database 208, the example event subunion controller 210, the example report generator 212 and/or, more generally, the example audience estimator 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 202, the example grouping controller 204, the example audience size calculator 206, the example audience estimate database 208, the example event subunion controller 210, and/or the example report generator 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience estimator 110 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
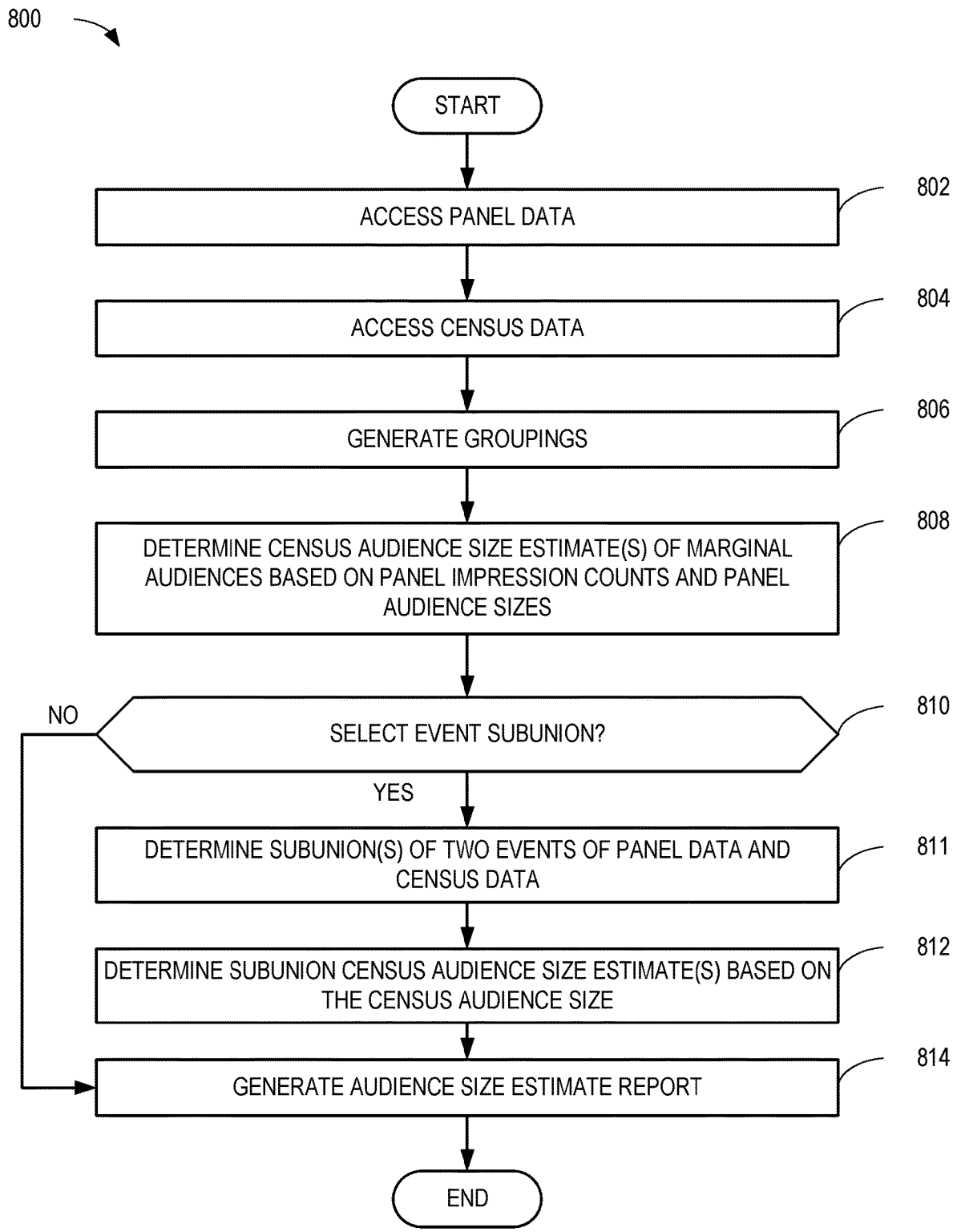
FIG. 8 is a flowchart representative of example machine readable instructions that may be executed to implement the example audience estimator of FIGS. 1 and/or 2 to deduplicate audience members and impressions.

A flowchart representative of example hardware logic, machine readable instructions, hardware implemented state machines, and/or any combination thereof for implementing the audience estimator 110 of FIG. 2 is shown in FIG. 8. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 8, many other methods of implementing the example audience estimator 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions that may be executed to implement the example audience estimator 110 of FIGS. 1 and/or 2 to deduplicate audience members and impressions. The example program 800 of FIG. 8 begins at block 802 at which the network interface 202 (FIG. 2) accesses panel data. For example, the network interface 202 may receive panel impression counts and panel audience sizes from the panel database 102 (FIG. 1). In some examples, the panel impression counts and/or the panel audience sizes correspond to events (e.g., visiting a website, watching media, etc.), marginal audiences (e.g., visiting a website on a desktop, visiting a website on a mobile device, etc.), etc.

At block 804, the example network interface 202 accesses census data. For example, the network interface 202 may receive census impression counts and/or total census audience size from the census database 104 (FIG. 1). In some examples, the census impression counts correspond to events (e.g., visiting a website, watching media, etc.), marginal audiences (e.g., visiting a website on a desktop, visiting a website on a mobile device, etc.), etc.

At block 806, the example grouping controller 204 (FIG. 2) groups the panel data and census data into independent groups. For example, the grouping controller 204 groups the panel data and census data based on demographic information. For example, the grouping controller 204 groups first and second events (e.g., visiting website A, visiting website B) together for audience members corresponding to females aged 2-12.

At block 808, the example audience size calculator 206 (FIG. 2) determines census audience size estimates of marginal audiences based on panel impression counts and panel audience sizes. For example, the audience size calculator 206 uses Equations 17 and 18 to determine census audience size estimates for one or more grouped events. Additionally or alternatively, the audience size calculator 206 uses Equations 20b and 26 to determine census audience size estimates for one or more grouped marginal audiences. In some examples, the audience size calculator 206 stores the census audience size estimates of events and/or marginal audiences in the example audience estimate database 208 (FIG. 2).

At block 810, the example event subunion controller 210 (FIG. 2) determines whether to select event subunions. For example, the event subunion controller 210 determines whether to select subunions of marginal audiences (e.g., website A, all platforms, etc.). If at block 810 the example event subunion controller 210 determines to not select event subunions, control advances to block 814. However, if at block 810 the event subunion controller 210 determines to select an event subunion, control advances to block 811 at which the example event subunion controller 210 determines subunion(s) of two events of panel data and census data. For example, if the panel data and census data include marginal audiences A, B, and C, the event subunion controller 210 can select the subunions AB, AC, and/or BC.

At block 812, the audience size calculator 206 determines subunion census audience size estimates based on the census audience size. For example, the audience size calculator 206 uses Equation 28 to determine census audience size estimates of the selected subunions. For example, if the panel data and census data include marginal audiences A, B, and C, and the event subunion controller 210 selects the subunions AB, AC, and BC, the audience size calculator 206 uses Equations 29a, 29b, 29c to determine the corresponding census audience sizes of the subunions. In some examples, the audience size calculator 206 stores the subunion census audience size estimates in the audience estimate database 208.

At block 814, the example report generator 212 (FIG. 2) generates an audience size estimate report. For example, the report generator 212 generates a report including the census audience sizes corresponding to events, marginal audiences, and/or subunion marginal audiences stored in the audience estimate database 208.

Figure 9:
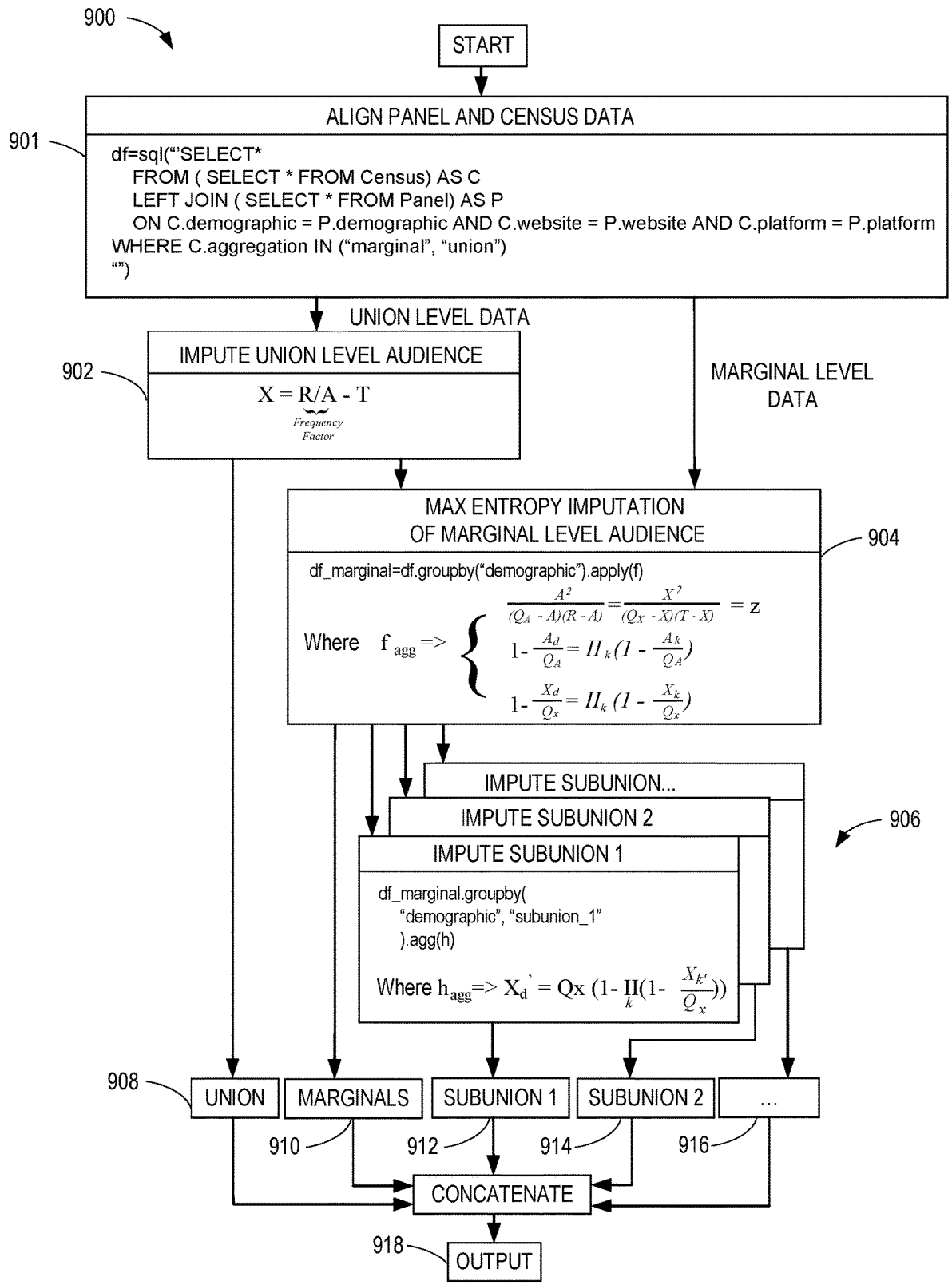
FIG. 9 is an example flowchart that may be executed to implement the example audience estimator of FIGS. 1 and/or 2 to estimate audience sizes.

FIG. 9 is an example flowchart 900 that may be executed to implement the example audience estimator 110 of FIGS. 1 and/or 2 to estimate audiences sizes. In the illustrated example of FIG. 9, the flowchart 900 is implemented using data frames and Python syntax. At block 901, the example network interface 202 (FIG. 2) accesses and aligns panel and census data. For example, the network interface 202 accesses panel and census data from the panel database 102 and the census database 104, respectively.

At block 902, the example audience size calculator 206 (FIG. 2) imputes union audience size. That is, the example audience size calculator 206 determines the total census audience size (e.g., the example union 908). For example, the audience size calculator 206 uses Equation 22 to estimate the total census audience size, X. At block 904, the example audience size calculator 206 imputes marginal audiences. In the illustrated example of FIG. 9, at block 904, the grouping controller 204 (FIG. 2) groups panel and census data. For example, the grouping controller 204 groups the panel data based on demographic data. The example audience size calculator 206 determines audience sizes of grouped marginal audiences (e.g., the marginals 910). That is, the example audience size calculator 206 can determine marginal audience sizes of groups concurrently. For example, the audience size calculator 206 uses Equations 20a, 20b, and 21 to determine audience sizes of marginal audiences.

At block 906, the example audience size calculator 206 imputes subunions. That is, the event subunion controller 210 (FIG. 2) determines subunions of the marginal audiences (e.g., subunion 1, subunion 2, etc.). The example audience size calculator 206 uses Equation 28 to determine census audience sizes of the selected subunions. For example, if the event subunion controller 210 selects N number of subunions, the audience size calculator 206 determines N subunion census audience sizes (e.g., the example subunion 1 912, the example subunion 2 914, and the example subunion N 916).

In some examples, the example output 918 includes the union 908, the marginals 910, the subunion 1 912, the subunion 2 914, and/or the subunion N 916. The example output 918 is stored in the example audience estimate database 208 (FIG. 2). In some examples, the report generator 212 (FIG. 2) generates an audience size estimate report including the output 918.

Figure 10:
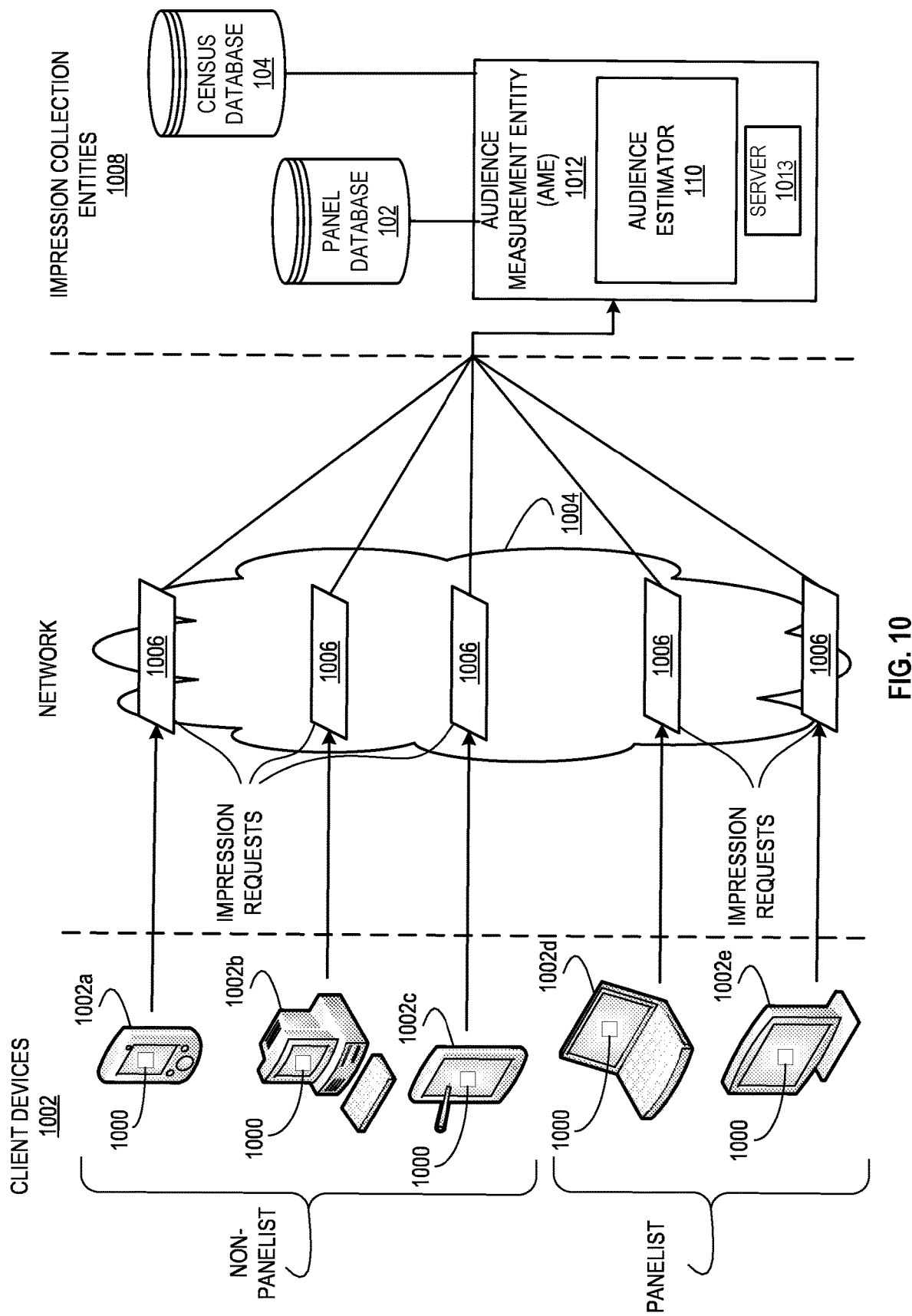
FIG. 10 illustrates example client devices that report audience impression requests for Internet-based media to impression collection entities to facilitate estimating sizes of audiences exposed to different Internet-based media and/or different unions of Internet-based media.

Example network-based impression logging techniques are described below in connection with FIG. 10. Such example techniques may be used to collect the panel impression information in the panel database 102 and the census impression information in the census database 104. FIG. 10 illustrates example client devices 1002 that report audience impression requests for Internet-based media 1000 to impression collection entities 1008 to identify a unique audience and/or a frequency distribution for the Internet-based media. The illustrated example of FIG. 10 includes the example client devices 1002, an example network 1004, example impression requests 1006, and the example impression collection entities 1008. As used herein, an impression collection entity 1008 refers to any entity that collects impression data such as, for example, an example AME 1012. Although only the AME 1012 is shown, other impression collection entities may also collect impressions. In the illustrated example, the AME 1012 logs panel impressions in the panel database 102 and logs census impressions in the census database 104. In other examples, one or more other impression collection entities in addition to or instead of the AME 1012 may log impressions for one or both of the panel database 102 and the census database 104. In some examples, the server 1013 of the AME 1012 logs census impressions in the census database 104 and another server of a database proprietor (separate from the AME 1012) logs panel impressions in the panel database 102 based on its subscribers. In such examples, subscribers of the database proprietor operate the panelist client devices 1002d and 1002e such that the database proprietor recognizes the panelist client devices 1002d, 1002e as operated by its subscribers based on information (e.g., first-party cookies) in the impression requests 1006 from the panelist client devices 1002d, 1002e. In the illustrated example, the AME 1012 includes the example audience estimator 110 of FIG. 1.

The example client devices 1002 of the illustrated example may be any device capable of accessing media over a network (e.g., the example network 1004). For example, the client devices 1002 may be an example mobile device 1002a, an example computer 1002b, 1002d, an example tablet 1002c, an example smart television 1002e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming, on-demand video and/or audio). Traditionally, content is provided at little or no cost to the audience because it is subsidized by advertisers that pay to have their advertisements distributed with the content. As used herein, "media" refers collectively and/or individually to content and/or advertisement(s).

The example network 1004 is a communications network. The example network 1004 allows the example impression requests 1006 from the example client devices 1002 to the example impression collection entities 1008. The example network 1004 may be a local area network, a wide area network, the Internet, a cloud, or any other type of communications network.

The impression requests 1006 of the illustrated example include information about accesses to media at the corresponding client devices 1002 generating the impression requests. Such impression requests 1006 allow monitoring entities, such as the impression collection entities 1008, to collect a number of media impressions for different media accessed via the client devices 1002. By collecting media impressions, the impression collection entities 1008 can generate media impression quantities for different media (e.g., different content and/or advertisement campaigns).

The impression collection entities 1008 of the illustrated example include the example panel database 102, the example census database 104, and the example AME 1012. In some examples, execution of the beacon instructions corresponding to the media 1000 causes the client devices 1002 to send impression requests 1006 to server 1013 (e.g., accessible via an Internet protocol (IP) address or uniform resource locator (URL)) of the impression collection entities 1008 in the impression requests 1006. In some examples, the beacon instructions cause the client devices 1002 to provide device and/or user identifiers and media identifiers in the impression requests 1006. The device/user identifier may be any identifier used to associate demographic information with a user or users of the client devices 1002. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) may be used. The media identifiers (e.g., embedded identifiers, embedded codes, embedded information, signatures, etc.) enable the impression collection entities 1008 can identify to media (e.g., the media 1000) objects accessed via the client devices 1002. The impression requests 1006 of the illustrated example cause the AME 1012 to log impressions for the media 1000. In the illustrated example, an impression request is a reporting to the AME 1012 of an occurrence of the media 1000 being presented at the client device 1002. The impression requests 1006 may be implemented as a hypertext transfer protocol (HTTP) request. However, whereas a transmitted HTTP request identifies a webpage or other resource to be downloaded, the impression requests 1006 include audience measurement information (e.g., media identifiers and device/user identifier) as its payload.

The server 1013 to which the impression requests 1006 are directed is programmed to log the audience measurement information of the impression requests 1006 as an impression (e.g., a media impression such as advertisement and/or content impressions depending on the nature of the media accessed via the client device 1002). In some examples, the server 1013 of the AME 1012 may transmit a response based on receiving an impression request 1006. However, a response to the impression request 1006 is not necessary. It is sufficient for the server 1013 to receive the impression request 1006 to log an impression request 1006. As such, in examples disclosed herein, the impression request 1006 is a dummy HTTP request for the purpose of reporting an impressions but to which a receiving server need not respond to the originating client device 1002 of the impression request 1006.

In the illustrated example, the example AME 1012 does not provide the media 1000 to the client devices 1002 and is a trusted (e.g., neutral) third party (e.g., The Nielsen Company, LLC) for providing accurate media access (e.g., exposure) statistics. The example AME 1012 includes the example audience estimator 110. As further disclosed herein, the example audience estimator 110 estimates census audience sizes of events, marginal audiences, and/or subunions of marginal audiences related to the example impression requests 1006. The example audience estimator 110 is described above in connection with FIGS. 1 and/or 2.

In operation, the example client devices 1002 employ web browsers and/or applications (e.g., apps) to access media. Some of the web browsers, applications, and/or media include instructions that cause the example client devices 1002 to report media monitoring information to one or more of the example impression collection entities 1008. That is, when the client device 1002 of the illustrated example accesses media, a web browser and/or application of the client device 1002 executes instructions in the media, in the web browser, and/or in the application to send the example impression request 1006 to one or more of the example impression collection entities 1008 via the network (e.g., a local area network, wide area network, wireless network, cellular network, the Internet, and/or any other type of network). The example impression requests 1006 of the illustrated example include information about accesses to the media 1000 and/or any other media at the corresponding client devices 1002 generating the impression requests 1006. Such impression requests allow monitoring entities, such as the example impression collection entities 1008, to collect media impressions for different media accessed via the example client devices 1002. In this manner, the impression collection entities 1008 can generate media impression quantities for different media (e.g., different content and/or advertisement campaigns).

The example AME 1012 accesses panel data and/or census data in the example panel database 102 and/or the example census database 104. The panel data and/or census data may include information relating to a total number of the logged impressions that correspond with a registered panelist and/or any other information related to the logged impressions (e.g., demographics, a total number of registered users exposed to the media 1000 more than once, etc.). The example audience estimator 110 estimates census audience sizes of events, marginal audiences, and/or subunions of marginal audiences based on impression requests 1006 in accordance with teachings of this disclosure.

Figure 11:
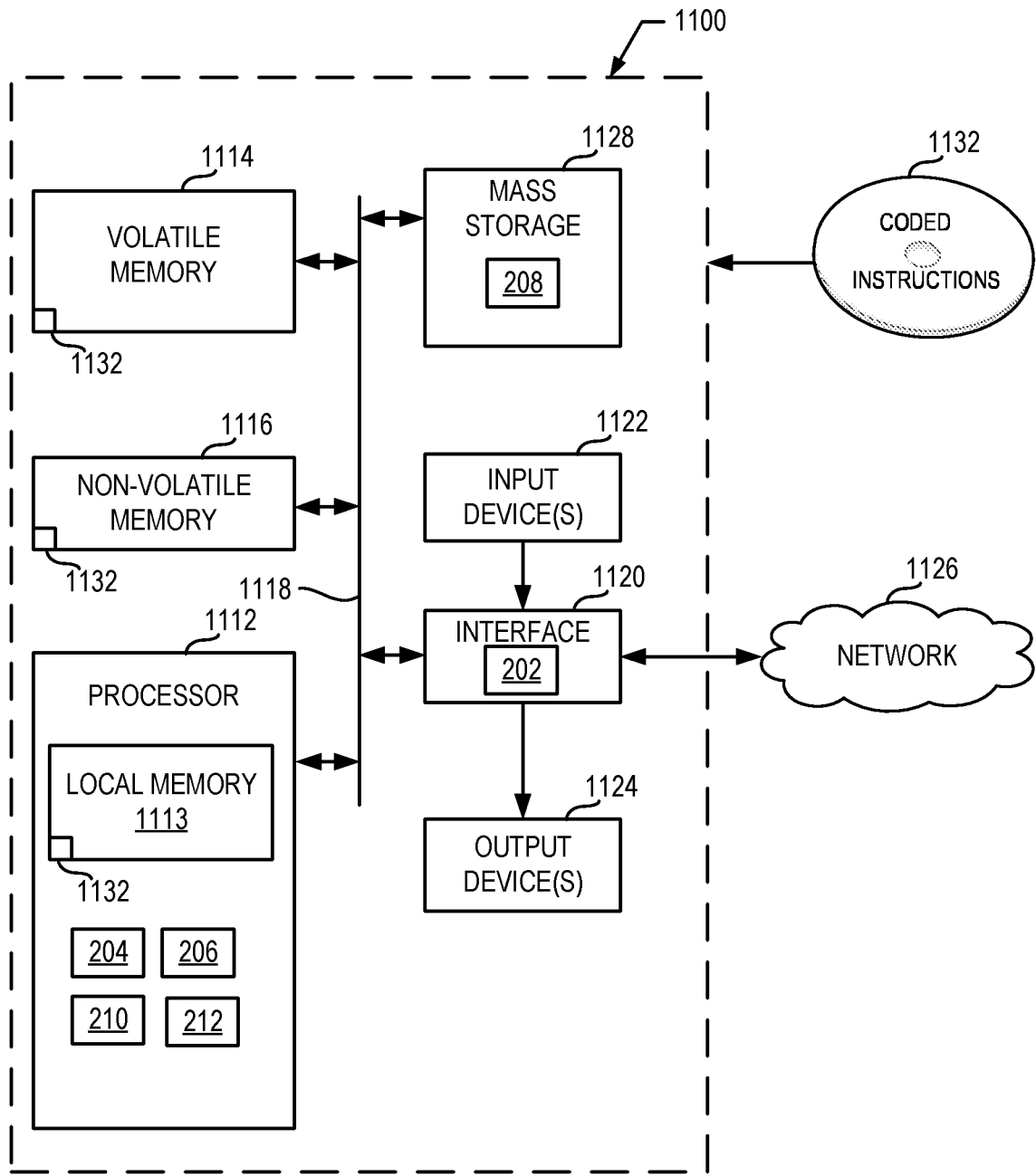
FIG. 11 is a block diagram of an example processing platform structured to execute machine readable instructions represented by the flowchart of FIG. 8 to implement the example audience estimator of FIGS. 1 and/or 2 to deduplicate audience members and impressions.

FIG. 11 is a block diagram of an example processor platform 1100 structured to execute the instructions of FIG. 8 to implement the audience estimator 110 of FIGS. 1 and/or 2. The processor platform 1100 can be, for example, a server, a personal computer, a workstation, a self-learning machine (e.g., a neural network), a mobile device (e.g., a cell phone, a smart phone, a tablet such as an iPad™), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example grouping controller 204, the example audience size calculator 206, the example event subunion controller 210, and the example report generator 212.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor. In the illustrated example, the interface 1120 implements the network interface 202.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In the illustrated example, the mass storage 1128 implements the audience estimate database 208.

Example machine executable instructions 1132 represented in FIG. 8 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that deduplicate and estimate audience sizes. The disclosed methods, apparatus and articles of manufacture improve the efficiency of using a computing device by grouping panel data and census data based on demographics. For example, the disclosed methods, apparatus and articles of manufacture substantially reduce processing time by determining census audience estimates concurrently. The disclosed methods, apparatus and articles of manufacture are accordingly directed to one or more improvement(s) in the functioning of a computer.

Example methods, apparatus, systems, and articles of manufacture for audience and impression deduplication are disclosed herein. Further examples and combinations thereof include the following:

Example 1 includes an apparatus, comprising a controller to determine a subunion of at least first and second marginal audiences of media based on panel data and census data, the panel data including a panel impression count and a panel audience size, and the census data including a census impression count, an audience size calculator to determine a census audience size of the at least the first and second marginal audiences based on the panel impression count and the panel audience size, and determine a subunion census audience size based on the census audience size, the subunion census audience size corresponding to an overlap between the at least the first and second marginal audiences, and a report generator to generate a report including the census audience size and the subunion census audience size, the census audience size indicative of audience members represented in the census data that accessed the media, and the subunion census audience size indicative of audience members represented in the census data of the subunion of the at least the first and second marginal audiences that accessed the media.

Example 2 includes the apparatus of example 1, wherein the panel impression count includes a first impression and a second impression and the panel audience size represents at least a first audience member, the first audience member corresponding to the first impression and the second impression.

Example 3 includes the apparatus of example 2, wherein the panel impression count is greater than or equal to the panel audience size.

Example 4 includes the apparatus of example 1, wherein the first marginal audience includes a first audience member and a second audience member and the second marginal audience includes the first audience member but not the second audience member, and the subunion of the at least the first and second marginal audiences includes a non-duplicate count of the first audience member and a non-duplicate count of the second audience member.

Example 5 includes the apparatus of example 1, wherein the at least the first and second marginal audiences correspond to an event, the event including at least one of visiting a website, accessing an advertisement, or using a device type.

Example 6 includes the apparatus of example 1, further including a second controller to group the panel data and the census data based on demographic data, the demographic data including at least one of gender or age.

Example 7 includes the apparatus of example 6, wherein the audience size calculator is to determine the census audience size of the first marginal audience and the census audience size of the second marginal audience concurrently.

Example 8 includes at least one non-transitory computer readable medium comprising instructions that, when executed, cause at least one processor to at least determine a subunion of at least first and second marginal audiences of media based on panel data and census data, the panel data including a panel impression count and a panel audience size, and the census data including a census impression count, determine a census audience size of the at least the first and second marginal audiences based on the panel impression count and the panel audience size, determine a subunion census audience size based on the census audience size, the subunion census audience size corresponding to an overlap between the at least the first and second marginal audiences, and generate a report including the census audience size and the subunion census audience size, the census audience size indicative of audience members represented in the census data that accessed the media, and the subunion census audience size indicative of audience members represented in the census data of the subunion of the at least the first and second marginal audiences that accessed the media.

Example 9 includes the at least one non-transitory computer readable medium of example 8, wherein the panel impression count includes a first impression and a second impression and the panel audience size represents at least a first audience member, the first audience member corresponding to the first impression and the second impression.

Example 10 includes the at least one non-transitory computer readable medium of example 9, wherein the panel impression count is greater than or equal to the panel audience size.

Example 11 includes the at least one non-transitory computer readable medium of example 8, wherein the first marginal audience includes a first audience member and a second audience member and the second marginal audience includes the first audience member but not the second audience member, and the subunion of the at least the first and second marginal audiences includes a non-duplicate count of the first audience member and a non-duplicate count of the second audience member.

Example 12 includes the at least one non-transitory computer readable medium of example 8, wherein the at least the first and second marginal audiences correspond to an event, the event including at least one of visiting a website, accessing an advertisement, or using a device type.

Example 13 includes the at least one non-transitory computer readable medium of example 8, wherein the instructions, when executed, cause the at least one processor to group the panel data and the census data based on demographic data, the demographic data including at least one of gender or age.

Example 14 includes the at least one non-transitory computer readable medium of example 13, wherein the instructions, when executed, cause the at least one processor to determine the census audience size of the first marginal audience and the census audience size of the second marginal audience concurrently.

Example 15 includes a method, comprising determining, by executing an instruction with a processor, a subunion of at least first and second marginal audiences of media based on panel data and census data, the panel data including a panel impression count and a panel audience size, and the census data including a census impression count, determining, by executing an instruction with the processor, a census audience size of the at least the first and second marginal audiences based on the panel impression count and the panel audience size, determining, by executing an instruction with the processor, a subunion census audience size based on the census audience size, the subunion census audience size corresponding to an overlap between the at least the first and second marginal audiences, generating, by executing an instruction with the processor, a report including the census audience size and the subunion census audience size, the census audience size indicative of audience members represented in the census data that accessed the media, and the subunion census audience size indicative of audience members represented in the census data of the subunion of the at least the first and second marginal audiences that accessed the media.

Example 16 includes the method of example 15, wherein the panel impression count includes a first impression and a second impression and the panel audience size represents at least a first audience member, the first audience member corresponding to the first impression and the second impression.

Example 17 includes the method of example 16, wherein the panel impression count is greater than or equal to the panel audience size.

Example 18 includes the method of example 15, wherein the at least the first and second marginal audiences correspond to an event, the event including at least one of visiting a website, accessing an advertisement, or using a device type.

Example 19 includes the method of example 15, further including grouping the panel data and the census data based on demographic data, the demographic data including at least one of gender or age.

Example 20 includes the method of example 19, further including determining the census audience size of the first marginal audience and the census audience size of the second marginal audience concurrently.

Example 21 includes an apparatus, comprising means for determining a subunion of at least first and second marginal audiences of media based on panel data and census data, the panel data including a panel impression count and a panel audience size, and the census data including a census impression count, means for calculating to determine a census audience size of the at least the first and second marginal audiences based on the panel impression count and the panel audience size, and determine a subunion census audience size based on the census audience size, the subunion census audience size corresponding to an overlap between the at least the first and second marginal audiences, and means for generating a report including the census audience size and the subunion census audience size, the census audience size indicative of audience members represented in the census data that accessed the media, and the subunion census audience size indicative of audience members represented in the census data of the subunion of the at least the first and second marginal audiences that accessed the media.

Example 22 includes the apparatus of example 21, wherein the panel impression count includes a first impression and a second impression and the panel audience size represents at least a first audience member, the first audience member corresponding to the first impression and the second impression.

Example 23 includes the apparatus of example 22, wherein the panel impression count is greater than or equal to the panel audience size.

Example 24 includes the apparatus of example 21, wherein the first marginal audience includes a first audience member and a second audience member and the second marginal audience includes the first audience member but not the second audience member, and the subunion of the at least the first and second marginal audiences includes a non-duplicate count of the first audience member and a non-duplicate count of the second audience member.

Example 25 includes the apparatus of example 21, wherein the at least the first and second marginal audiences correspond to an event, the event including at least one of visiting a website, accessing an advertisement, or using a device type.

Example 26 includes the apparatus of example 21, further including means for grouping the panel data and the census data based on demographic data, the demographic data including at least one of gender or age.

Example 27 includes the apparatus of example 26, wherein the means for calculating is to determine the census audience size of the first marginal audience and the census audience size of the second marginal audience concurrently.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A computing system comprising a processor and a memory, the computing system configured to perform a set of acts comprising:
   obtaining, from a panel database, panelist data obtained using panel meters located at panelist sites, the panelist data including (i) a first panelist impression count and a first panel audience size for a first website, (ii) a second panelist impression count and a second panel audience size for a second website, and (iii) a total panel audience size for the first website and the second website, wherein there is overlap between audience members of the first panel audience size and the second panel audience size;
   obtaining, from a census database, census data obtained using beacon instructions that cause client devices to send impression requests to an impression collection system, the census data including (i) a first census impression count for the first website and (ii) a second census impression count for the second website;
   determining a pseudo-universe estimate for the panelist data using the first panel audience size, the second panel audience size, and the total panel audience size;
   determining a pseudo-universe estimate for the census data using a total census audience size;
   determining a first census audience size for the first website using the pseudo-universe estimate for the census data and the total census audience size; and
   generating a report including the first census audience size,
   wherein determining the pseudo-universe estimate for the census data and the first census audience size comprises solving a system of two equations having the pseudo-universe estimate for the census data and the first census audience size as unknown variables.

2. The computing system of claim 1, wherein the set of acts further comprises determining the total census audience size using the total panel audience size, the first panelist impression count, the second panelist impression count, the first census impression count, and the second census impression count.

3. The computing system of claim 1, wherein the impression requests are transmitted by the client devices using network communications.

4. The computing system of claim 3, wherein the network communications are hypertext transfer protocol requests.

5. The computing system of claim 1, wherein:
the set of acts further comprises determining a second census audience size for the second website using the pseudo-universe estimate for the census data and the total census audience size, and
the report further includes the second census audience size.

6. The computing system of claim 5, wherein the report further includes the total census audience size.

7. A non-transitory computer-readable medium having stored therein instructions that, upon execution by one or more processors, cause a computing system to perform a set of acts comprising:
obtaining, from a panel database, panelist data obtained using panel meters located at panelist sites, the panelist data including (i) a first panelist impression count and a first panel audience size for a first website, (ii) a second panelist impression count and a second panel audience size for a second website, and (iii) a total panel audience size for the first website and the second website, wherein there is overlap between audience members of the first panel audience size and the second panel audience size;
obtaining, from a census database, census data obtained using beacon instructions that cause client devices to send impression requests to an impression collection system, the census data including (i) a first census impression count for the first website and (ii) a second census impression count for the second website;
determining a pseudo-universe estimate for the panelist data using the first panel audience size, the second panel audience size, and the total panel audience size;
determining a pseudo-universe estimate for the census data using a total census audience size;
determining a first census audience size for the first website using the pseudo-universe estimate for the census data and the total census audience size; and
generating a report including the first census audience size,
wherein determining the pseudo-universe estimate for the census data and the first census audience size comprises solving a system of two equations having the pseudo-universe estimate for the census data and the first census audience size as unknown variables.

8. The non-transitory computer-readable medium of claim 7, wherein the set of acts further comprises determining the total census audience size using the total panel audience size, the first panelist impression count, the second panelist impression count, the first census impression count, and the second census impression count.

9. The non-transitory computer-readable medium of claim 7, wherein the impression requests are transmitted by the client devices using network communications.

10. The non-transitory computer-readable medium of claim 9, wherein the network communications are hypertext transfer protocol requests.

11. The non-transitory computer-readable medium of claim 7, wherein:
the set of acts further comprises determining a second census audience size for the second website using the pseudo-universe estimate for the census data and the total census audience size, and
the report further includes the second census audience size.

12. The non-transitory computer-readable medium of claim 11, wherein the report further includes the total census audience size.

13. A method comprising:
obtaining, from a panel database, panelist data obtained using panel meters located at panelist sites, the panelist data including (i) a first panelist impression count and a first panel audience size for a first website, (ii) a second panelist impression count and a second panel audience size for a second website, and (iii) a total panel audience size for the first website and the second website, wherein there is overlap between audience members of the first panel audience size and the second panel audience size;
obtaining, from a census database, census data obtained using beacon instructions that cause client devices to send impression requests to an impression collection system, the census data including (i) a first census impression count for the first website and (ii) a second census impression count for the second website;
determining a pseudo-universe estimate for the panelist data using the first panel audience size, the second panel audience size, and the total panel audience size;
determining a pseudo-universe estimate for the census data using a total census audience size;
determining a first census audience size for the first web site using the pseudo-universe estimate for the census data and the total census audience size; and
generating a report including the first census audience size,
wherein determining the pseudo-universe estimate for the census data and the first census audience size comprises solving a system of two equations having the pseudo-universe estimate for the census data and the first census audience size as unknown variables.

14. The method of claim 13, further comprising determining the total census audience size using the total panel audience size, the first panelist impression count, the second panelist impression count, the first census impression count, and the second census impression count.

15. The method of claim 13, wherein the impression requests are transmitted by the client devices using network communications.

16. The method of claim 15, wherein the network communications are hypertext transfer protocol requests.

17. The method of claim 13, further comprising determining a second census audience size for the second website using the pseudo-universe estimate for the census data and the total census audience size,
wherein the report further includes the second census audience size.

* * * * *